(12) United States Patent
Steele et al.

(10) Patent No.: US 8,967,178 B2
(45) Date of Patent: Mar. 3, 2015

(54) SATURATION VALVE ASSEMBLY FOR ELECTRIC CABLES

(75) Inventors: James Steele, Seattle, WA (US); William R. Stagi, Burien, WA (US); Alexander Babchanik, Kent, WA (US)

(73) Assignee: UTILX Corporation, Kent, WA (US)

( * ) Notice: Subject to any disclaimer, the term of this patent is extended or adjusted under 35 U.S.C. 154(b) by 251 days.

(21) Appl. No.: 13/452,474

(22) Filed: Apr. 20, 2012

(65) Prior Publication Data

US 2013/0276907 A1    Oct. 24, 2013

(51) Int. Cl.
*F16K 31/00* (2006.01)

(52) U.S. Cl.
USPC .................. 137/67; 137/571; 251/14

(58) Field of Classification Search
CPC ..... F16K 31/001; H01B 7/2813; H01B 13/00
USPC ............... 174/8, 15.6, 19, 20, 25; 251/12, 14; 137/67, 68.11, 571; 156/48
See application file for complete search history.

(56) References Cited

U.S. PATENT DOCUMENTS

| | | | | |
|---|---|---|---|---|
| 2,186,445 A | * | 1/1940 | Bennett | 174/11 R |
| 2,633,131 A | * | 3/1953 | Grosvenor, Jr. | 128/203.23 |
| 4,024,882 A | * | 5/1977 | Haigh et al. | 137/2 |
| 4,372,988 A | * | 2/1983 | Bahder | 427/541 |
| 4,545,133 A | * | 10/1985 | Fryszczyn et al. | 34/442 |
| 7,506,658 B2 | * | 3/2009 | Guest et al. | 137/78.3 |
| 7,690,391 B2 | * | 4/2010 | Guest et al. | 137/67 |

* cited by examiner

*Primary Examiner* — John Rivell
*Assistant Examiner* — Angelisa Hicks
(74) *Attorney, Agent, or Firm* — Christensen O'Connor Johnson Kindness PLLC

(57) ABSTRACT

A valve assembly configured to close off the flow of fluid within a fluid injection assembly includes a fluid column having a first open end and a second open end. A fluid flow path is defined between the first and second open ends of the fluid column, and a saturation valve portion is disposed within the fluid flow path. The saturation valve portion is a first configuration when no fluid is flowing through the fluid flow path, and the saturation valve portion transitions to a second configuration when fluid is flowing through the fluid flow path.

72 Claims, 15 Drawing Sheets

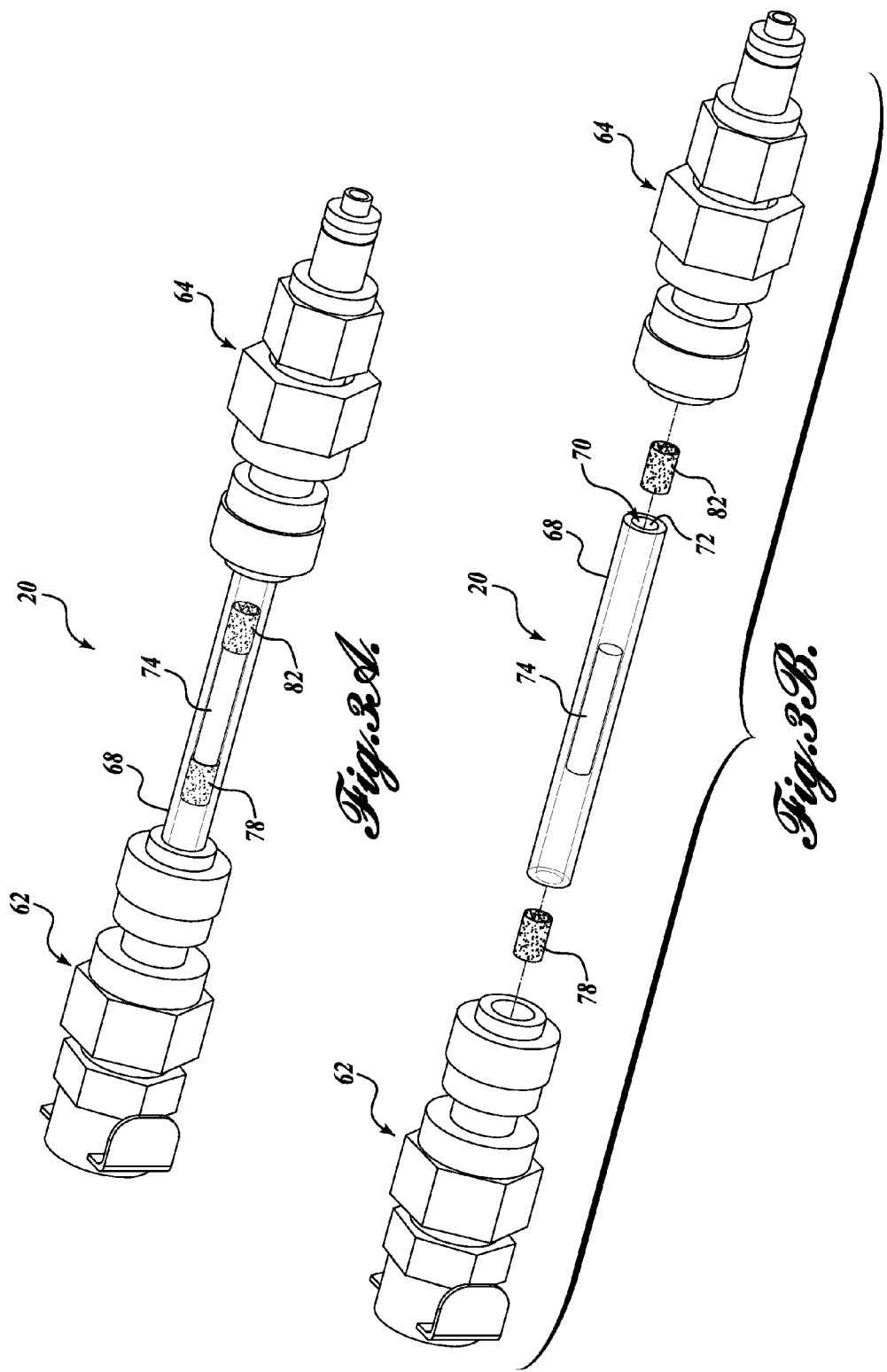

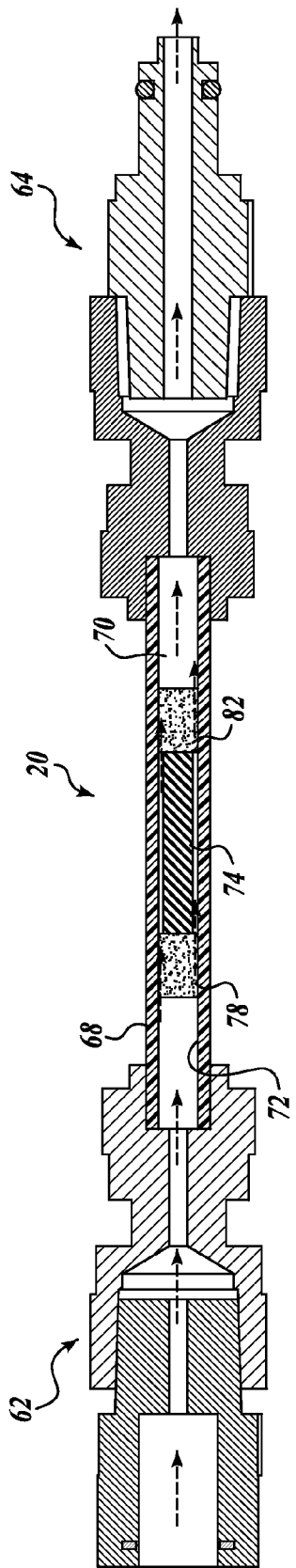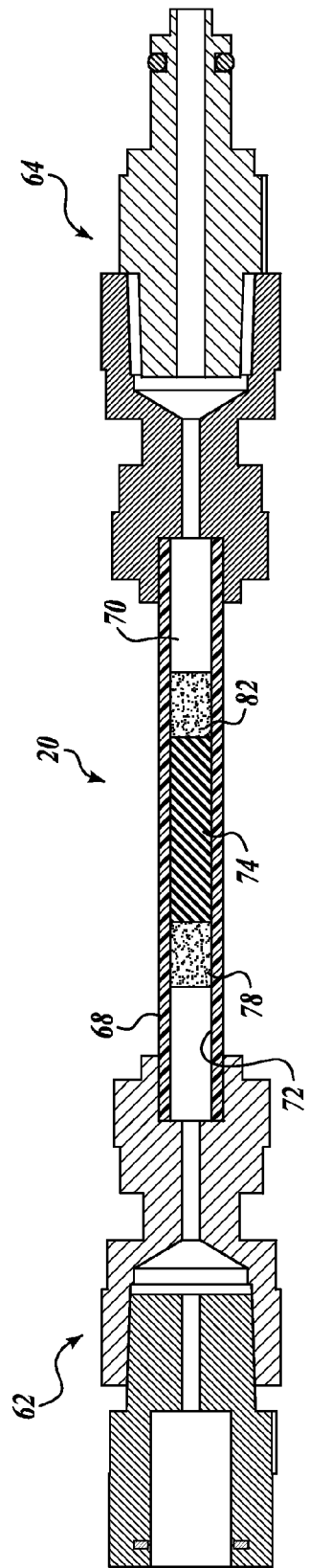

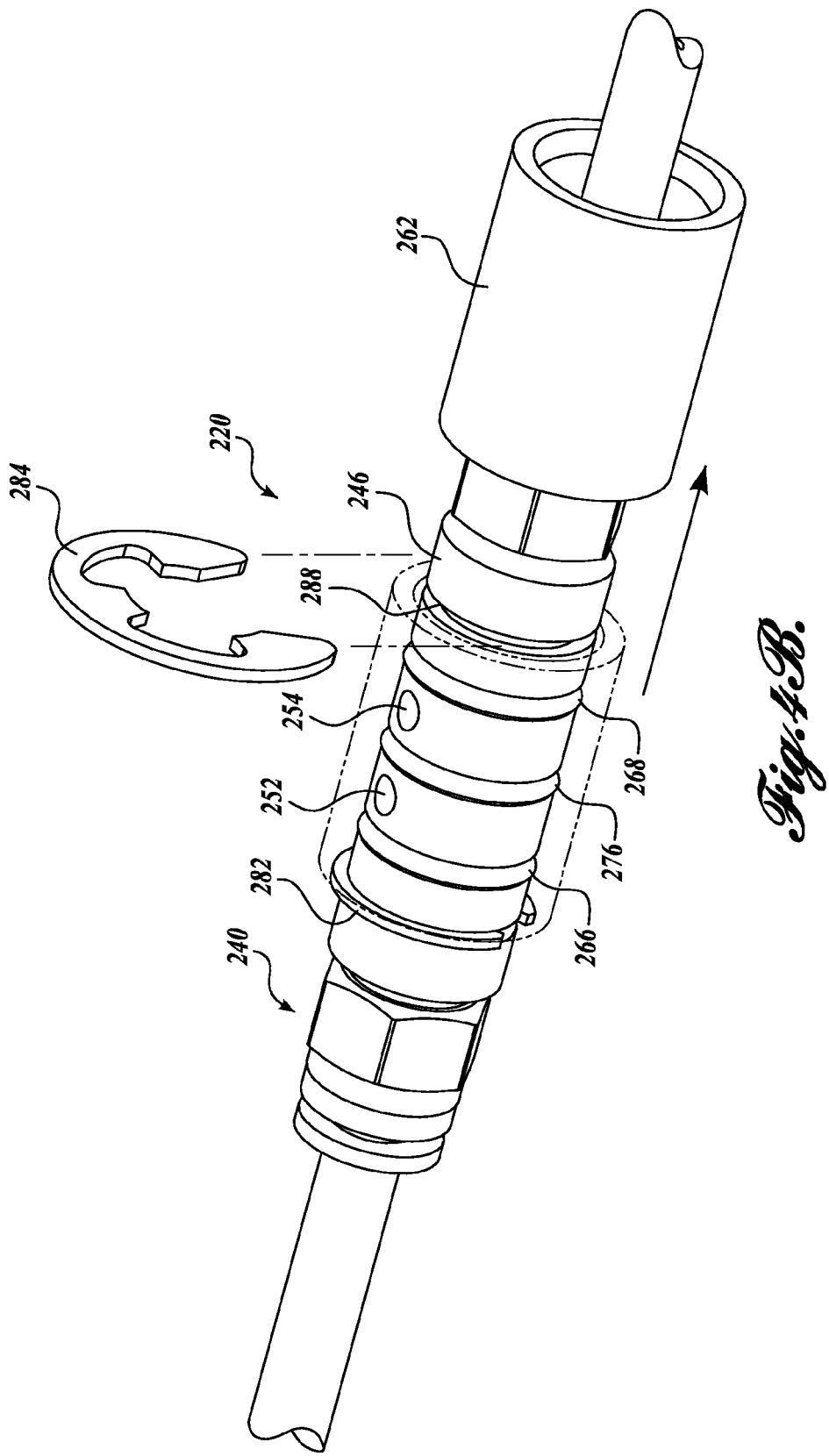

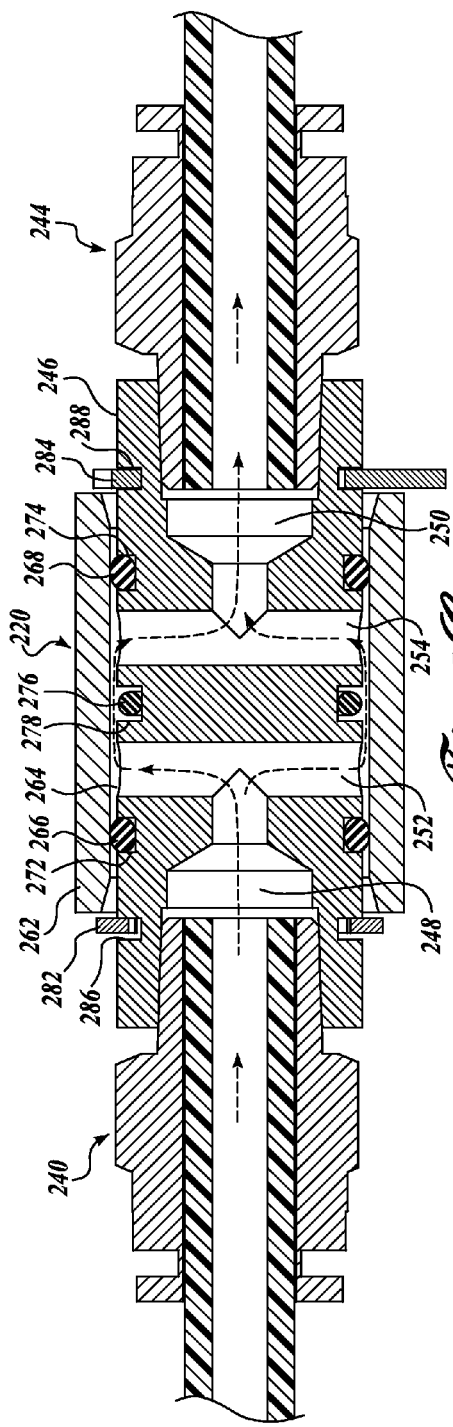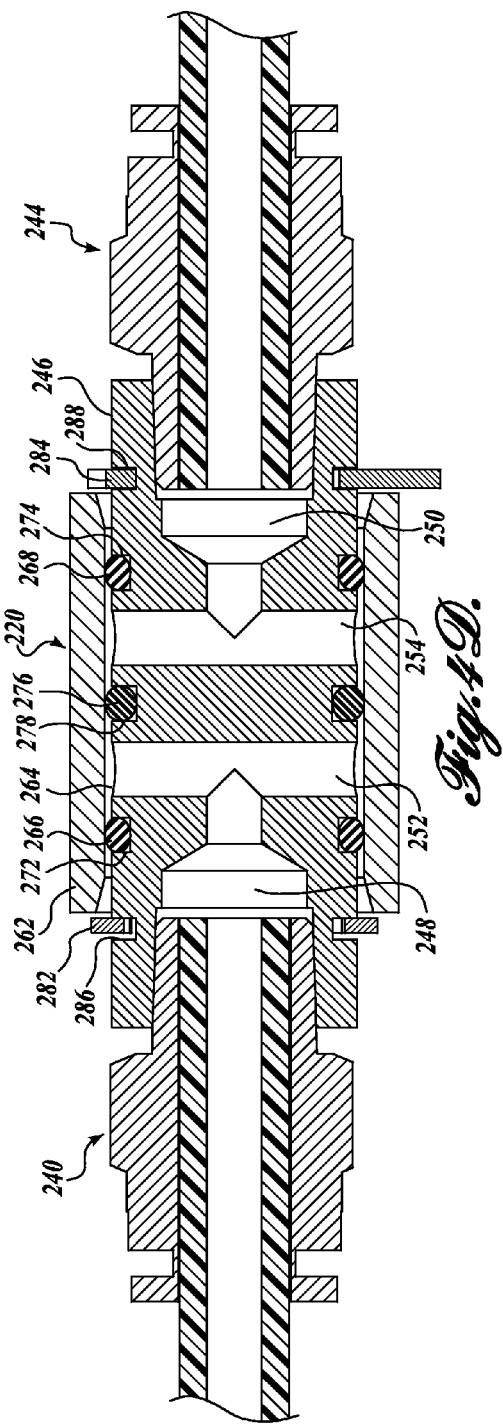

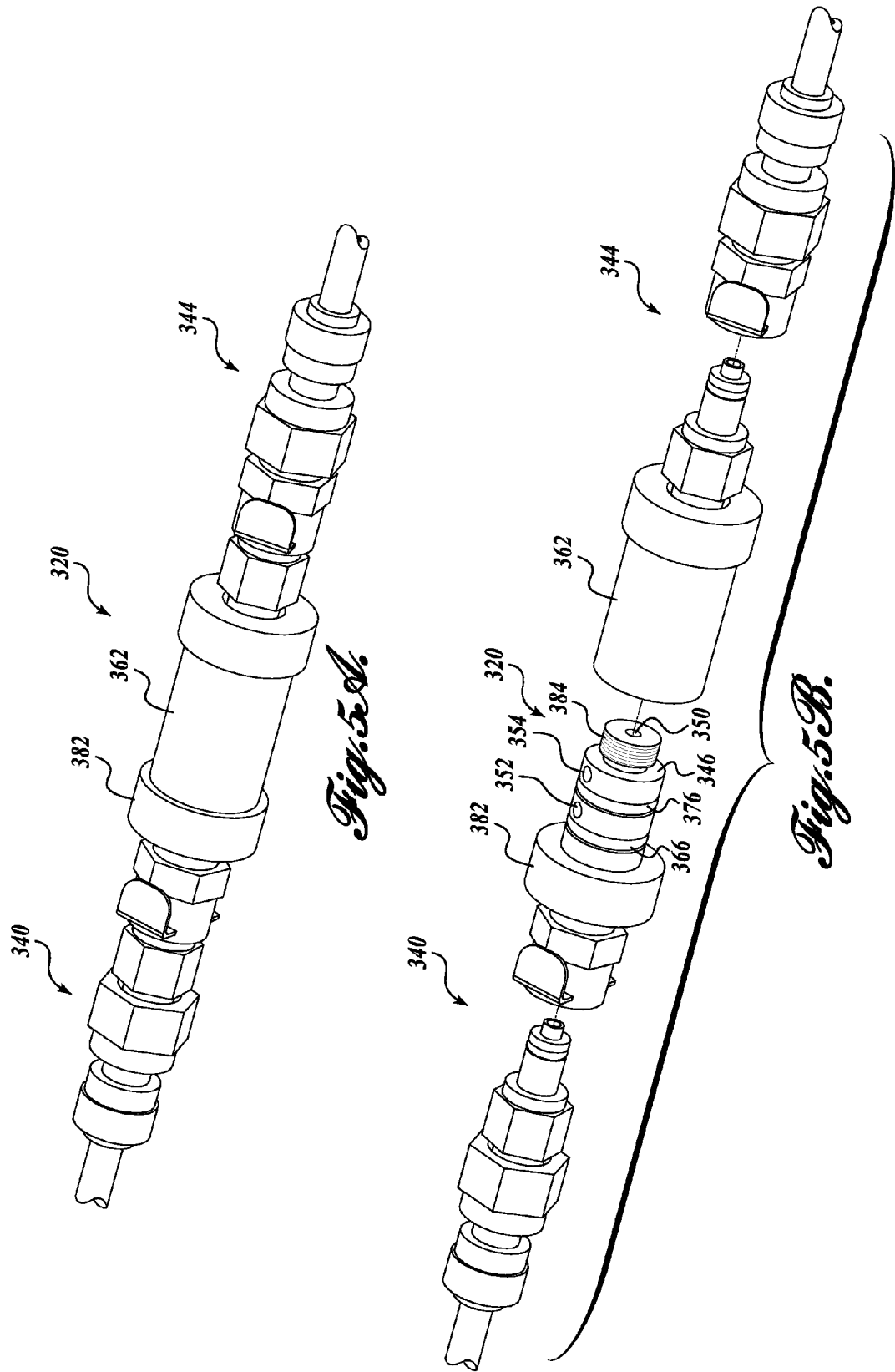

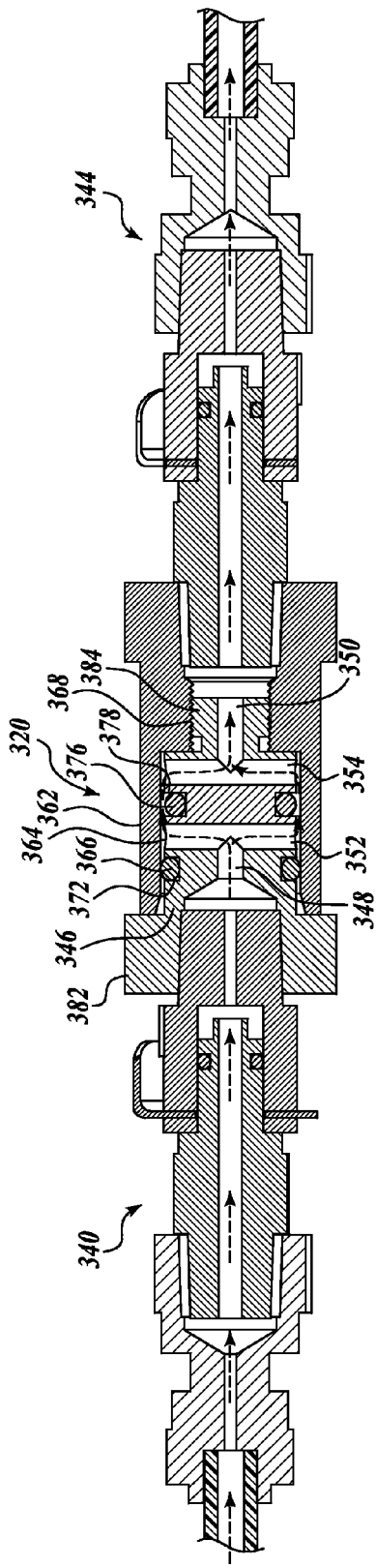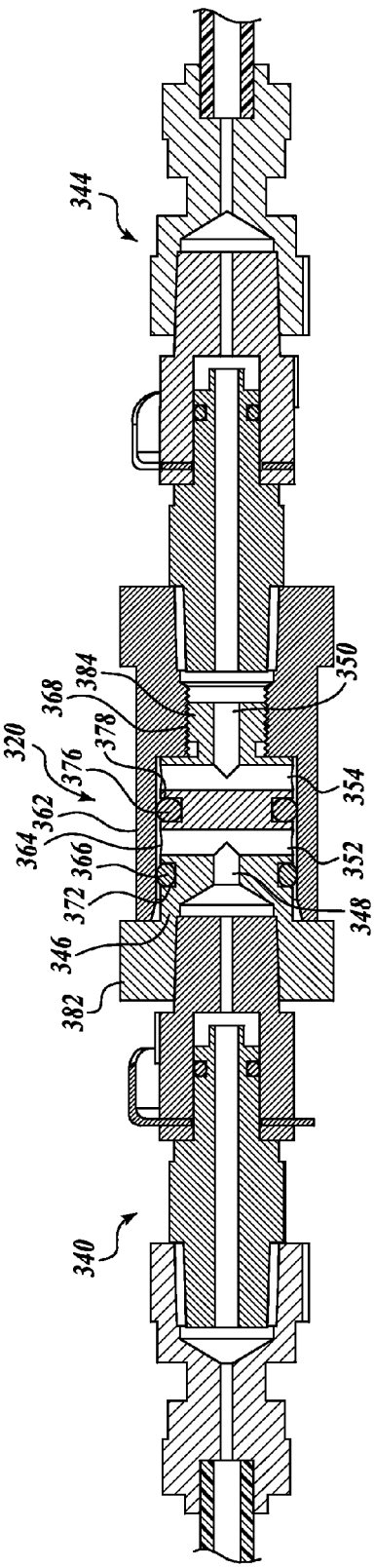
Fig. 5C.
Fig. 5D.

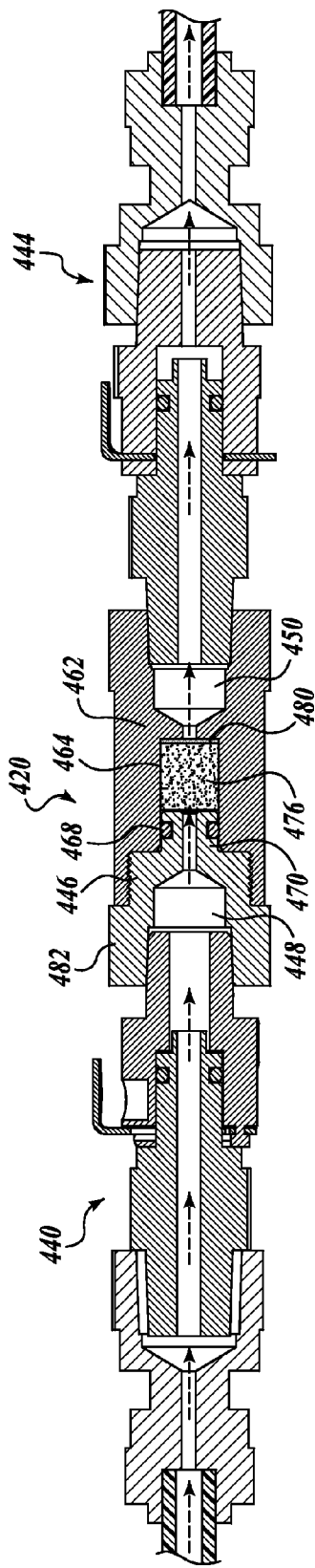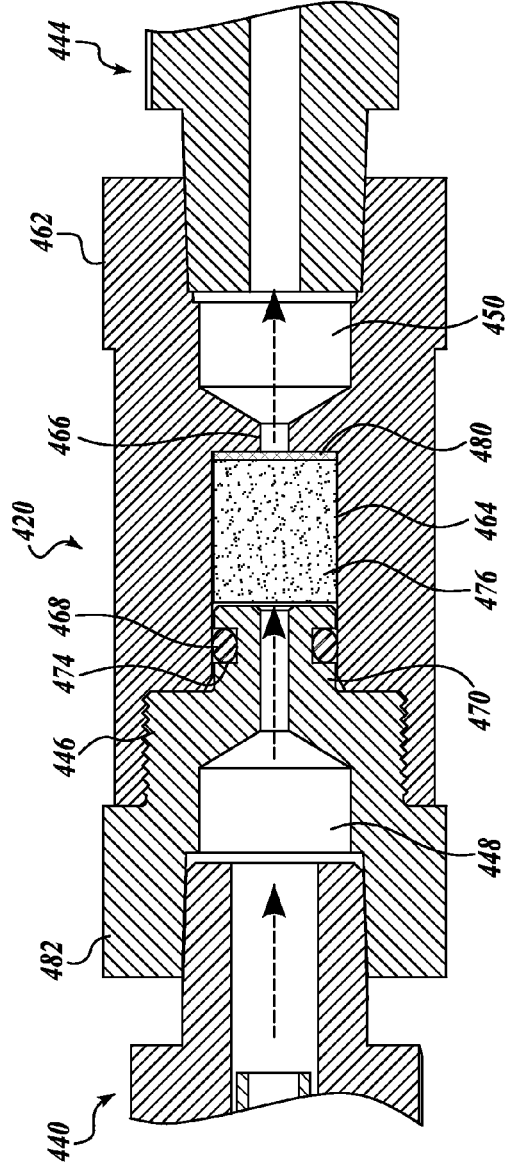

SATURATION VALVE ASSEMBLY FOR ELECTRIC CABLES

BACKGROUND

Typical cables include a conductor, such as a number of copper or aluminum strands, surrounded by an insulation layer. In some instances, the life span of a cable is shortened when water enters the cable and forms micro-voids in the insulation layer. These micro-voids spread throughout the insulation layer in a tree like shape, collections of which are sometimes referred to as water trees.

Water trees are known to form in the insulation layer of electrical cables when voltage is applied to the cable in the presence of water and ions. As water trees grow, they compromise the dielectric properties of the insulation layer until failure occurs. Many large water trees initiate at the site of an imperfection or a contaminant, but contamination is not a necessary condition for water trees to propagate. In one prior art approach, water tree growth can be eliminated or retarded by removing or minimizing the water or ions, or by reducing the voltage stress.

Another prior art approach requires the injection of a dielectric enhancement restorative fluid into interstices located between the conductor strands of the cables. In a typical setup, a fluid feed tank and a vacuum tank are connected to opposite ends of the cable. The fluid feed tank consists of a fluid reservoir that is directly pressurized with compressed helium. The fluid feed tank also typically includes a sensor for determining the fluid level within the tank. For instance, an internal float valve may be disposed within the feed tank, which closes off flow when the fluid level reaches a certain minimum threshold level. The vacuum tank consists of a large reservoir that is sized to contain gases removed from the restorative fluid and the cable, thereby allowing for a complete fill of the restorative fluid within the interstices of the cable.

During operation, the fluid feed tank and the vacuum tank are left unattended, connected to the cable, for hours or even days as the injection progresses. As fluid fills the cable interstices, fluid will begin to exit the cable and fill the vacuum tank. Unless an operator interrupts or stops the injection process, fluid will continue to flow into the cable until the fluid level in the feed tank drops and the float valve is triggered to close. After a predetermined amount of time, an operator will return to the site, and he/she will remove the vacuum tank and replace the feed tank with a soak tank if supplemental fluid is needed to fully treat the cable. The soak tank would be left connected to the cable for an additional 60-90 days.

The above-described injection setup is not without its problems. For instance, if the feed tank is moved into a non-vertical position, the float valve will not be triggered to close when the fluid drops to a predetermined level. Thus, fluid from the feed tank, including compressed helium, will continue to flow into the cable. The compressed gas creates voids within the cable.

Moreover, even if the float valve properly closes, a superfluous amount of fluid will be collected in the vacuum tank before the float valve closes if the volume of fluid within the feed tank exceeds that which is needed to completely fill the cable. As the injection process takes place mostly unattended, the operator must estimate the starting fluid level within the feed tank so as to have a sufficient amount to completely fill the cable, but not so much so that the fluid simply collects in the vacuum tank.

As the injection time varies with the cable length and flow restrictions, the injection time can fluctuate greatly for each setup. Using caution and overestimating the starting level of the fluid leads to excessive amounts of waste fluid collected in the vacuum tank. If the level is too low, the cable may sit for hours or days with the valve shut off and with the vacuum connected, which can create voids in the cable as the fluid diffuses into the insulation and the vacuum pulls fluid into the vacuum tank. To help avoid this issue, operators must check each injection setup frequently.

Based on the foregoing, an improved valve assembly is needed for closing off flow within a cable injection setup assembly similar to the setup described above, which includes a cable extending between a feed tank and a vacuum tank. In particular, there is a need for an improved valve assembly that will close off fluid flow within the assembly in a reliable manner, that will help prevent the vacuum tank from withdrawing fluid from the cable when the float valve is closed, that will help prevent unnecessary waste of restorative fluid, and that will minimize the need for monitoring the setup.

SUMMARY

A valve assembly configured to close off the flow of fluid within a fluid injection assembly includes a fluid column having a first open end and a second open end. A fluid flow path is defined between the first and second open ends of the fluid column, and a saturation valve portion is disposed within the fluid flow path. The saturation valve portion is a first configuration when no fluid is flowing through the fluid flow path, and the saturation valve portion transitions to a second configuration when fluid is flowing through the fluid flow path.

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

DESCRIPTION OF THE DRAWINGS

The foregoing aspects and many of the attendant advantages of the present disclosure will become more readily appreciated by reference to the following detailed description, when taken in conjunction with the accompanying drawings, wherein:

FIG. 3A is an isometric view of the first embodiment of the valve assembly disposed between first and second connector fitting assemblies;

FIG. 3B is an exploded isometric view of the first embodiment of the valve assembly and the first and second connector fitting assemblies of FIG. 3A;

FIG. 3C is a cross sectional view of the first embodiment of the valve assembly and the first and second connector fitting assemblies of FIG. 3A, wherein the valve assembly is shown in a first position;

FIG. 3D is a cross sectional view of the first embodiment of the valve assembly and the first and second connector fitting assemblies of FIG. 3A, wherein the valve assembly is shown in a second position;

FIG. 4B is an isometric partially exploded view of the second embodiment of the valve assembly and the first and second connector fitting assemblies of FIG. 4A, wherein the portion of the valve assembly is shown in an unlocked position;

FIG. 4C is a cross sectional view of the second embodiment of the valve assembly and the first and second connector fitting assemblies of FIG. 4A, wherein the valve assembly is shown in a first position;

FIG. 4D is a cross sectional view of the second embodiment of the valve assembly and the first and second connector fitting assemblies of FIG. 4A, wherein the valve assembly is shown in a second position;

FIG. 5A is an isometric view of a third embodiment of a valve assembly disposed between first and second connector fitting assemblies;

FIG. 5B is an exploded isometric view of the third embodiment of the valve assembly and the first and second connector fitting assemblies of FIG. 5A;

FIG. 5C is a cross sectional view of the third embodiment of the valve assembly and the first and second connector fitting assemblies of FIG. 5A, wherein the valve assembly is shown in a first position;

FIG. 5D is a cross sectional view of the third embodiment of the valve assembly and the first and second connector fitting assemblies of FIG. 5A, wherein the valve assembly is shown in a second position;

FIG. 6B is a cross sectional view of the fourth embodiment of the valve assembly and the first and second connector fitting assemblies of FIG. 6A;

FIG. 6C is a partial cross sectional view of the fourth embodiment of the valve assembly and the first and second connector fitting assemblies of FIG. 6A;

DETAILED DESCRIPTION

Figure 1:
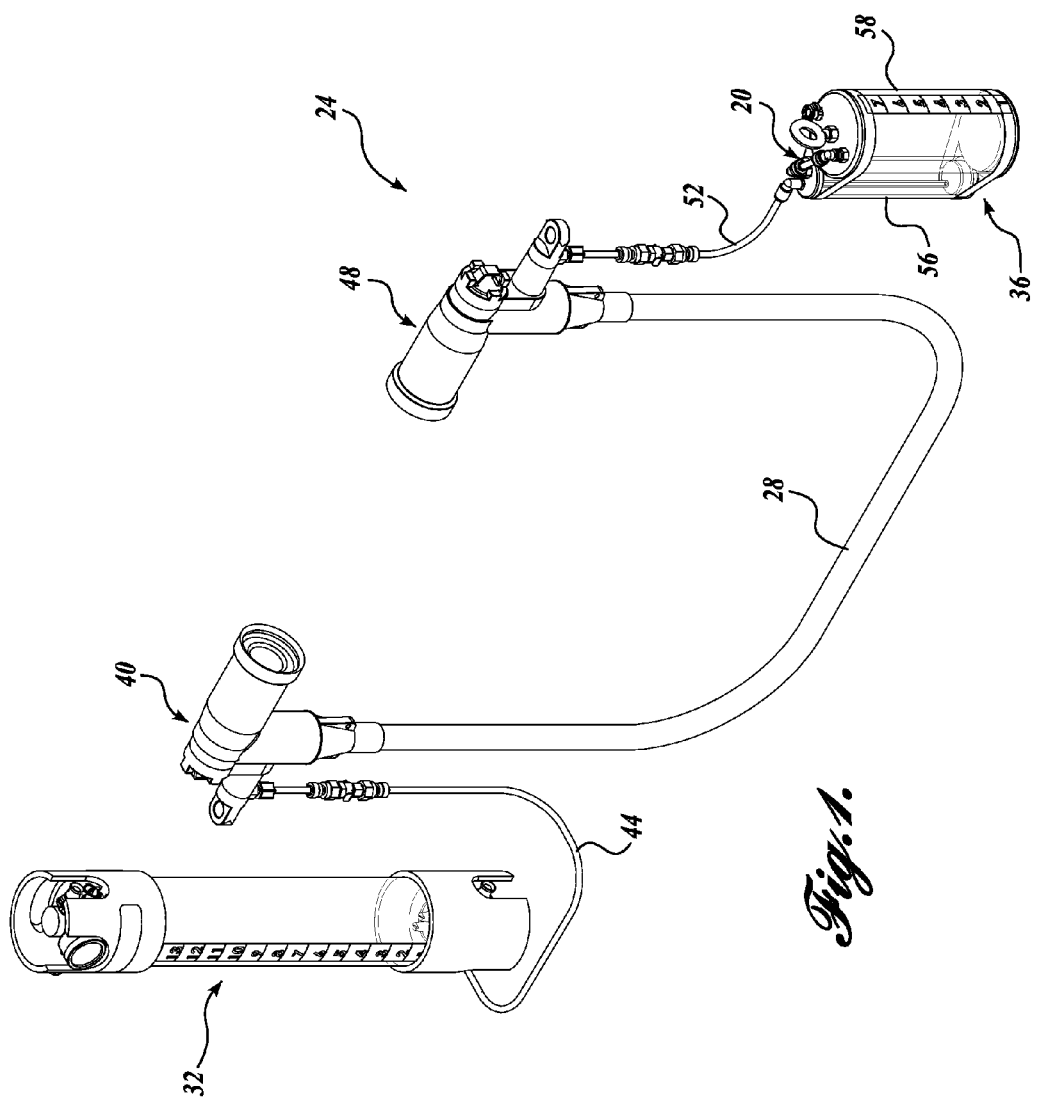
FIG. 1 is an environmental view of a cable injection setup suitable for use with a valve assembly formed in accordance with a first exemplary embodiment of the present disclosure.

A valve assembly 20 formed in accordance with a first exemplary embodiment of the present disclosure suitable for use with a cable injection setup 24 may best be seen by referring to FIG. 1. In the depicted embodiment, the cable injection setup 24 includes a cable 28 extending between and in fluid communication with a fluid feed tank 32 and a discard/vacuum tank subassembly 36. However, it should be appreciated that the valve assembly 20 may be used with any suitable cable injection setup. Thus, the descriptions and illustrations provided herein should not be seen as limiting the scope of the present disclosure.

The equipment defining the injection setup 24 is well known in the art; and therefore, it will only be briefly described in detail. As stated above, the cable 28 extends between a fluid feed tank 32 and a discard/vacuum tank subassembly 36. The cable 28 may be any well known or to be developed cable, such a cable having a plurality of conductors surrounded by an insulation layer.

The feed tank 32 is suitably sized to contain a sufficient amount of restorative fluid, such as CABLECURE®, CABLECURE®/XL, CABLECURE®/DMDB, CABLECURE®/SD, CABLECURE®/CB, etc., for injection into the cable 28. The feed tank 32 may include a float valve (not shown) that shuts off flow to the cable 28 when the fluid level within the feed tank 32 reaches a predetermined minimum threshold. The feed tank 32 is in fluid communication with a first injection elbow 40 through a first fluid conduit 44. The first injection elbow 40 injects fluid into a first end of the cable 28 in a manner well known in the art.

A second end of the cable 28 is in fluid communication with a second injection elbow 48. Fluid within the cable 28 can exit the cable 28 through the second injection elbow 48 and pass into a second fluid conduit 52. The fluid within the cable 28 may include water and other residual fluid present within the injection fittings, tubing, or connectors, as well as any excess restorative fluid injected into the cable 28 (hereinafter sometimes collectively referred to as "flushed cable fluid"). The fluid exits the cable 28 and flows into the discard/vacuum tank subassembly 36.

Figure 2:
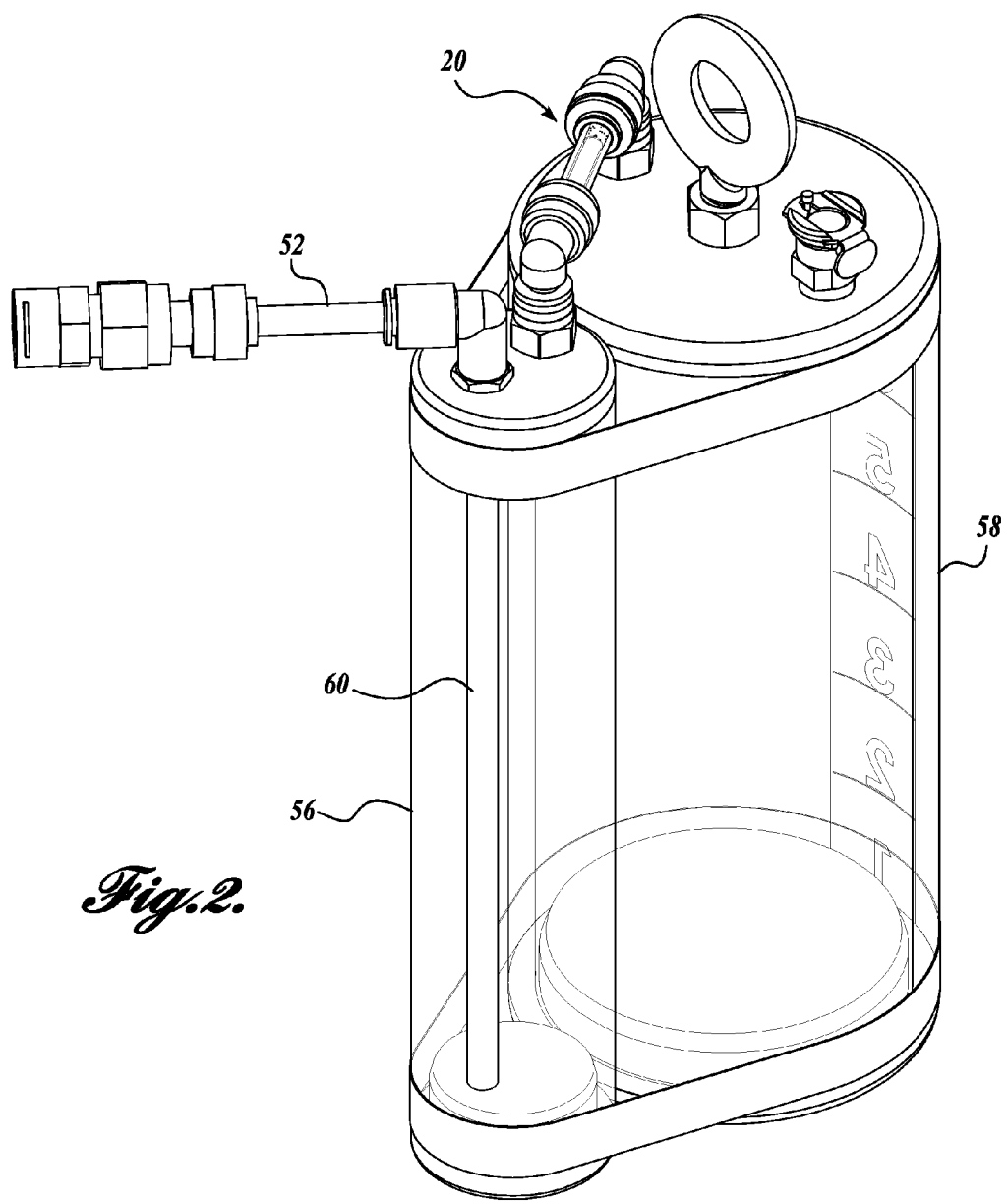
FIG. 2 is an environmental view of a discard/vacuum tank subassembly of the cable system of FIG. 1 shown in use with the first embodiment of the valve assembly.
Figure 4A:
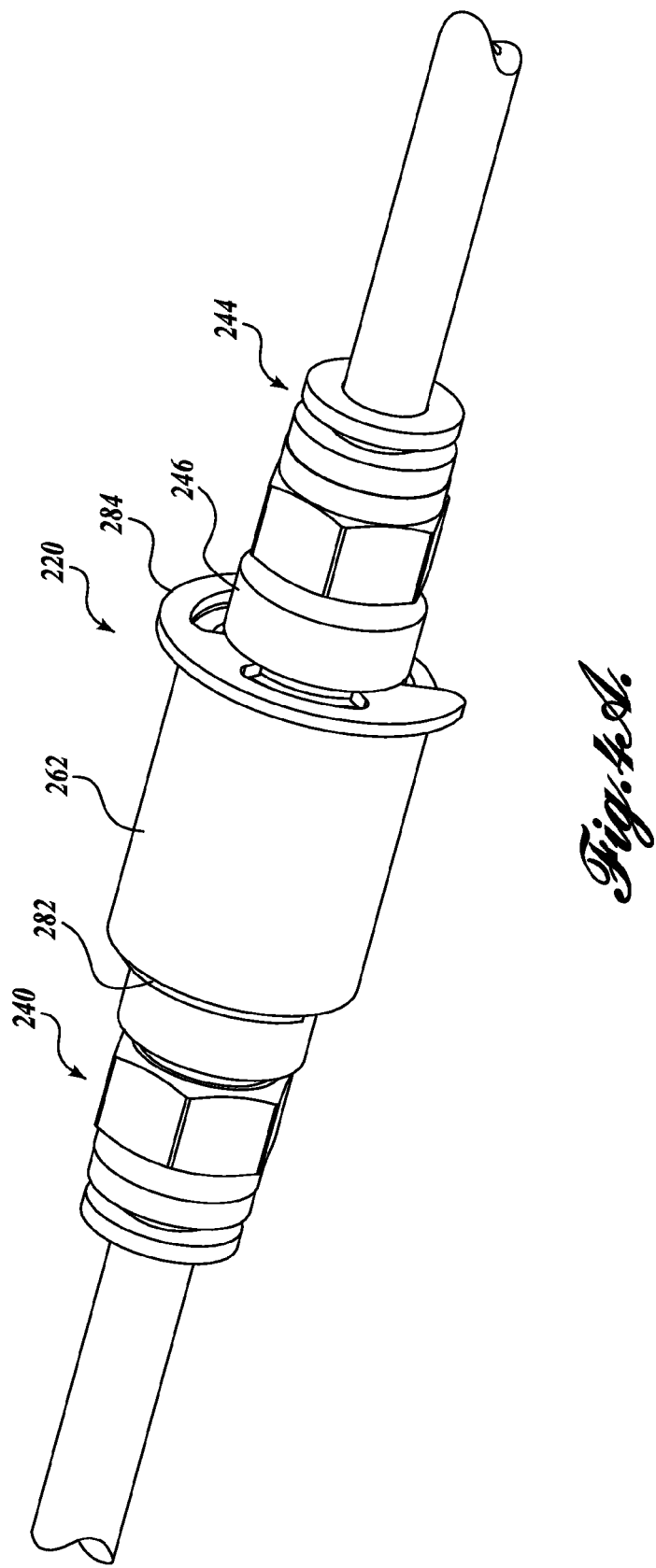
FIG. 4A is an isometric view of a second embodiment of a valve assembly disposed between first and second connector fitting assemblies, wherein a portion of the valve assembly is shown in a locked position.

Referring additionally to FIG. 2, the discard/vacuum tank subassembly 36 includes at least one discard tank 56 and a vacuum tank 58. An inlet opening (not shown) in the upper end of the discard tank 56 is configured to be placed into fluid communication with the second fluid conduit 52 such that the fluid removed from the cable 28 may be deposited into the discard tank 56. The inlet opening is also in communication with an inlet conduit 60 that extends downwardly into the discard tank 56 toward a bottom end thereof. In this manner, fluid coming from the second fluid conduit 52 is deposited directly into the bottom of the discard tank 56.

The discard tank 56 is any suitable size and shape to contain a desired amount of flushed cable fluid. The discard tank 56 is also modular and may be connected in series with other discard tanks 56. Thus, the discard/vacuum tank subassembly 36 may be easily configured to include two or more discard tanks 56 to increase the discard tank volume for flushing additional cable fluid.

An outlet opening (not shown) is defined in the upper end of the discard tank 56 for allowing fluid to exit the discard tank 56. The outlet opening of the discard tank 56 is configured to be placed into fluid communication with the valve assembly 20. With the outlet opening defined in the upper end of the discard tank 56, the fluid level must reach the upper end of the discard tank 56 (i.e., fill the discard tank 56) before the fluid will exit through the outlet opening. In this manner, fluid that is deposited into the bottom of the discard tank 56 through the inlet conduit 60 is not sucked into the outlet opening (and thereafter into the valve assembly 20) due to the suction of a vacuum source. Moreover, because the discard tank 56 must be filled by the desired amount of flushed cable fluid before the fluid exits the discard tank 56, the valve assembly 20 is not closed off prematurely due to residual cable fluid collected within the discard tank 56.

It should be appreciated that the inlet and outlet openings of the discard tank 56 may instead be spaced apart or separated in any other manner to prevent the fluid from passing directly from the inlet to the outlet. Moreover, the discard tank 56 and/or the discard/vacuum tank subassembly 36 may be modified or adapted to help ensure that the discard tank 56 remains in a substantially vertical position. In this manner, fluid does not exit the outlet opening of the discard tank 56 until it substantially fills the discard tank 56 or otherwise reaches a predetermined threshold. For instance, the discard tank 56 may include an attachment assembly for hanging the discard tank 56 in an upright, vertical position from a post, wall, etc. The discard tank 56 may instead be secured to a post in the ground or another secure object. Thus, such modifications and adaptations are within the scope of the present disclosure.

As noted above, the valve assembly 20 extends between and is in fluid communication with the discard tank 56 and the vacuum tank 58. More specifically, the valve assembly 20 is in communication with the outlet opening of the discard tank and an inlet opening of the vacuum tank 58. The vacuum tank 58 is also in fluid communication with a vacuum source (not shown) for withdrawing fluids from the cable 28. The vacuum tank 58 may be any suitable size and shape for containing a predetermined volume of fluid.

Referring to FIGS. 3A-3D, the valve assembly 20 will now be described in detail. The valve assembly 20 is configured to close off fluid flow from the discard tank 56 to the vacuum tank 58 shortly after the flushed cable fluid fills the discard tank 56 and begins flowing into the vacuum tank 58. It can be appreciated that with the valve assembly 20 closing shortly after the flushed cable fluid reaches the valve assembly 20, only a portion of the flushed cable fluid contained within the discard tank 56 is sucked into the vacuum tank 58.

The valve assembly 20 is disposed between first and second quick disconnect fitting assemblies 62 and 64, which are configured to be selectively placed into fluid communication with the discard tank 56 and the vacuum tank 58, respectively. More specifically, the first fitting assembly 62 is configured to be selectively placed into fluid communication with the outlet opening of the discard tank 56 (or an elbow fitting in communication with the outlet opening). The second fitting assembly 64 is configured to be selectively placed into fluid communication with the inlet opening of the vacuum tank 58 (or an elbow fitting in communication with the inlet opening).

The first and second quick disconnect fitting assemblies 62 and 64 can be easily disconnected from and reconnected to the discard tank 56 and the vacuum tank 58 to allow for easy removal of and replacement of the valve assembly 20. In this manner, if the operator returns to the injection setup 24 and further fluid needs to be injected, the discard tank 56 and valve assembly 20 can be replaced and the process can begin again. Any suitable quick disconnect fitting assemblies well known in the art or later developed may be used; and therefore, the details first and second quick disconnect fitting assemblies 62 and 64 will not be further described.

The valve assembly 20 generally includes a valve fluid column 68 removably receivable within or otherwise connectable to the first and second fitting assemblies 62 and 64. The valve fluid column 68 includes a central, longitudinal opening 70 that defines an inner conduit surface 72 and first and second open ends. A fluid flow path is defined between the first and second open ends of the fluid column 68. In that regard, the valve fluid column 68 may be made from a suitable material that can transport flushed cable fluid from the discard tank 56 to the vacuum tank 58, such as Teflon. Moreover, the material of the valve fluid column 68 may be translucent or transparent such that the components of the valve assembly 20 and the fluid flowing therethrough may be visible to an operator.

The valve assembly 20 includes a saturation valve portion that closes off flow within the valve assembly 20 when saturated with restorative fluid. The saturation valve portion is disposed within the fluid flow path of the fluid column 68, and the saturation valve portion is in a first configuration when no restorative fluid is flowing through the flow path to allow fluid to continue flowing through the valve assembly 20. The saturation valve portion transitions into a second configuration when restorative fluid flows through the flow path of the fluid column 68 to close off flow within the valve assembly 20.

The saturation valve portion is defined by an elongated cord or plug 74 is disposed within the longitudinal opening 70 of the column 68 and extends along a portion of the length thereof. In the first configuration, the outer diameter of the elongated plug 74 is smaller than the inner diameter of the central, longitudinal opening 70 of the column 68. As such, fluid may flow through the gap defined between the outer surface of the elongated plug 74 and the inner conduit surface 72.

The elongated plug 74 is made from a material that is incompatible with the restorative fluid. Specifically, the elongated plug 74 transitions to the second configuration by swelling or increasing in volume when it is saturated by restorative fluid, such as CABLECURE®, CABLECURE®/XL, CABLECURE®/DMDB, CABLECURE®/SD, CABLECURE®/CB, etc. The chemicals used in these restorative fluids include phenylmethyldimethoxysilane, dimethyldimethoxysilane, trimethylmethoxysilane, dimethyldibutoxysilane, tolylethylmethyldimethoxysilane, dimethoxymethyl[2-(methylphenyl)ethyl]silane, cyanobutylmethyldimethoxysilane, 2-(4-methylphenethyl)methylbis(2-ethylhexoxy)silane, di(2-ethylhexoxy)methyl[2-(methylphenyl)ethyl]silane, 3-cyanobutylmethylbis(2-ethylhexoxy)silane, acetephenone, etc.

The elongated plug 74 swells or increases in volume when saturated by the restorative fluid to eventually close off the gap between the outer surface of the elongated plug 74 and the inner conduit surface 72. In this manner, when the fluid rises to the upper end of the discard tank 56 and begins flowing through the valve assembly 20, the elongated plug 74 will close the valve assembly 20, thereby shutting off all fluid flow between the discard tank 56 and the vacuum tank 58.

A number of tests and comparative tests were performed to investigate the solubility rate of diffusion characteristics and properties of various types of materials for use as an elongated plug 74. Various material samples were saturated with certain restorative fluids to determine the change in volume of the material after exposure to the restorative fluids and the rate of diffusion of restorative fluids into the material ("the solubility and rate of diffusion criteria"). These test results are included below in EXPERIMENTS 1 and 2.

The inventors have found that when saturated with the restorative fluid phenylmethyldimethoxysilane, neoprene (polychoroprene), silicone rubber (50 Durometer) and silicone rubber (60 Durometer) meet the solubility and rate of diffusion criteria. The inventors have also found that when saturated with the restorative fluid dimethyldibutoxysilane, the materials butyl rubber, silicone rubber (50 Durometer), and silicone rubber (60 Durometer) meet the solubility and rate of diffusion criteria.

EXPERIMENT 1

Solubility and Rate of Diffusion Test

The purpose of this experiment was to determine: (1) the change in volume of an elastomer after exposure to restorative fluids; and (2) the rate of diffusion of the restorative fluids into the elastomer. For testing, common elastomers such as Buna-N (nitrile rubber), neoprene (polychoroprene), butyl rubber, Viton (fluoroelastomer), and silicone rubber (50 and 60 Durometer) were exposed to two common restorative fluids phenylmethyldimethoxysilane and dimethyldibutoxysilane.

Test sample elastomers were prepared by cutting 5 cm squares from thin sheets of elastomers approximately 0.15 cm thick. PYREX® beakers (500 mL) were cleaned and dried. Each beaker was partially filled with enough restorative fluids to fully cover the test samples. Parafilm was used to cover the beakers and limit influence on the experiment from moisture and contamination.

Working in a lab temperature of 23° C., test samples were rinsed in isopropyl alcohol for approximately 3-4 seconds and then dried with compressed air. Dimensional data (length, width and thickness) and mass was recorded for each test sample. Test samples were then individually placed in the test beakers and the start time was recorded. Periodically, test samples were removed from the fluid (approximately every 20-120 minutes depending on rate of absorption), rinsed with isopropyl alcohol, dried with compressed air and weighed. The experiment was continued for approximately 48 hours until saturation was reached for all test samples. The final dimensional data (length, width and thickness) was record for each of the test samples.

Solubility data was recorded for each of the test samples for each restorative fluid, which includes the change in mass $(m_2-m_1)$ of the test sample over time. The solubility data is tabulated in TABLES 1 and 2 below and is also depicted graphically in the charts shown in FIGS. 7 and 8.

TABLE 1

CableCURE/DMDB Fluid (dimethyldibutoxysilane) @ 23° C.

| Buna-N | | Neoprene | | Butyl | | Viton | | Si (60Duro) | | Si (50Duro) | |
|---|---|---|---|---|---|---|---|---|---|---|---|
| Time (s) | Mass (g) | Time (s) | Mass (g) | Time (s) | Mass (g) | Time (s) | Mass (g) | Time (s) | Mass (g) | Time (s) | Mass (g) |
| 0 | 0.000 | 0 | 0.000 | 0 | 0.000 | 0 | 0.000 | 0 | 0.000 | 0 | 0.000 |
| 1500 | 0.015 | 1680 | 0.167 | 1680 | 0.245 | 5280 | 0.000 | 1740 | 1.443 | 1860 | 2.199 |
| 4980 | 0.029 | 5100 | 0.347 | 5100 | 0.488 | 12720 | 0.000 | 3120 | 2.440 | 3240 | 3.102 |
| 12480 | 0.050 | 12600 | 0.650 | 7980 | 0.643 | 19680 | 0.000 | 5040 | 3.429 | 5160 | 4.089 |
| 19380 | 0.062 | 19560 | 0.884 | 12600 | 0.859 | 75840 | 0.000 | 7620 | 4.205 | 7740 | 5.018 |
| 75600 | 0.142 | 75660 | 1.048 | 19560 | 1.174 | 86400 | 0.000 | 9120 | 4.588 | 9180 | 5.261 |
| 86220 | 0.156 | 86220 | 1.018 | 75720 | 1.218 | 104100 | 0.000 | 11040 | 4.952 | 11160 | 5.641 |
| 103860 | 0.173 | 103860 | 1.005 | 86340 | 1.209 | | | 12840 | 5.146 | 12960 | 5.908 |
| | | | | 103980 | 1.188 | | | 14880 | 5.372 | 15000 | 5.866 |
| | | | | | | | | 16800 | 5.474 | 16920 | 6.074 |
| | | | | | | | | 19200 | 5.488 | 19440 | 6.173 |
| | | | | | | | | 20760 | 5.529 | 20820 | 6.247 |
| | | | | | | | | 22320 | 5.551 | 22680 | 6.311 |
| | | | | | | | | 24660 | 5.667 | 24660 | 6.321 |
| | | | | | | | | 26100 | 5.707 | 26340 | 6.321 |
| | | | | | | | | 28320 | 5.613 | 28440 | 6.390 |
| | | | | | | | | 86280 | 5.728 | 86400 | 6.437 |
| | | | | | | | | 93660 | 5.807 | 108180 | 6.432 |
| | | | | | | | | 100800 | 5.836 | | |
| | | | | | | | | 108000 | 5.819 | | |

TABLE 2

CableCURE Fluid (phenylmethyldimethoxysilane) @ 23° C.

| Buna-N | | Neoprene | | Butyl | | Viton | | Si (60Duro) | | Si (50Duro) | |
|---|---|---|---|---|---|---|---|---|---|---|---|
| Time (s) | Mass (g) | Time (s) | Mass (g) | Time (s) | Mass (g) | Time (s) | Mass (g) | Time (s) | Mass (g) | Time (s) | Mass (g) |
| 0 | 0.000 | 0 | 0.000 | 0 | 0.000 | 0 | 0.000 | 0 | 0.000 | 0 | 0.000 |
| 1500 | 0.270 | 1380 | 0.408 | 1500 | 0.055 | 4860 | 0.012 | 1260 | 0.534 | 1380 | 0.631 |
| 2880 | 0.414 | 4680 | 0.944 | 4680 | 0.098 | 12360 | 0.020 | 2580 | 0.925 | 2700 | 0.950 |
| 4800 | 0.543 | 7680 | 1.354 | 12180 | 0.160 | 19260 | 0.025 | 4500 | 1.167 | 4620 | 1.195 |
| 7320 | 0.724 | 12180 | 1.931 | 19080 | 0.196 | 75360 | 0.050 | 7020 | 1.465 | 7140 | 1.447 |
| 8940 | 0.807 | 19080 | 2.628 | 75180 | 0.390 | 86160 | 0.055 | 8700 | 1.551 | 8820 | 1.503 |
| 10920 | 0.928 | 75180 | 3.640 | 85980 | 0.390 | 103800 | 0.060 | 10560 | 1.710 | 10740 | 1.607 |
| 12720 | 1.033 | 85680 | 3.662 | 103620 | 0.385 | | | 12360 | 1.790 | 12540 | 1.662 |
| 14760 | 1.131 | 103500 | 3.684 | | | | | 14280 | 1.840 | 14520 | 1.717 |
| 16500 | 1.247 | | | | | | | 16260 | 1.917 | 16380 | 1.738 |
| 18840 | 1.361 | | | | | | | 18480 | 1.953 | 18660 | 1.775 |
| 20460 | 1.455 | | | | | | | 20100 | 1.948 | 20280 | 1.790 |
| 22440 | 1.515 | | | | | | | 22200 | 2.003 | 22260 | 1.769 |
| 24300 | 1.629 | | | | | | | 23940 | 1.994 | 24120 | 1.793 |
| 26100 | 1.695 | | | | | | | 25680 | 2.021 | 25860 | 1.804 |
| 27900 | 1.787 | | | | | | | 27420 | 2.053 | 27720 | 1.822 |
| 85920 | 2.267 | | | | | | | 85620 | 2.018 | 85740 | 1.765 |
| 93300 | 2.270 | | | | | | | 92820 | 2.057 | 93060 | 1.751 |

TABLE 2-continued

| CableCURE Fluid (phenylmethyldimethoxysilane) @ 23° C. | | | | | | | | | | | |
|---|---|---|---|---|---|---|---|---|---|---|---|
| Buna-N | | Neoprene | | Butyl | | Viton | | Si (60Duro) | | Si (50Duro) | |
| Time (s) | Mass (g) | Time (s) | Mass (g) | Time (s) | Mass (g) | Time (s) | Mass (g) | Time (s) | Mass (g) | Time (s) | Mass (g) |
| 100560 | 2.269 | | | | | | | 100020 | 2.008 | 100260 | 1.750 |
| 107700 | 2.261 | | | | | | | 107220 | 2.050 | 107520 | 1.771 |

The solubility (g/cm³) of the restorative fluid in each test sample was determined by dividing the overall change in mass ($m_2-m_1$) by the initial volume ($V_1$) of the test sample using the following equation:

$$S=(m_2-m_1)/V_1$$

The rate of diffusion (cm²/s) was determined by using the following the equation:

$$D=0.049*thickness^2/time_{1/2}$$

Figure 7:
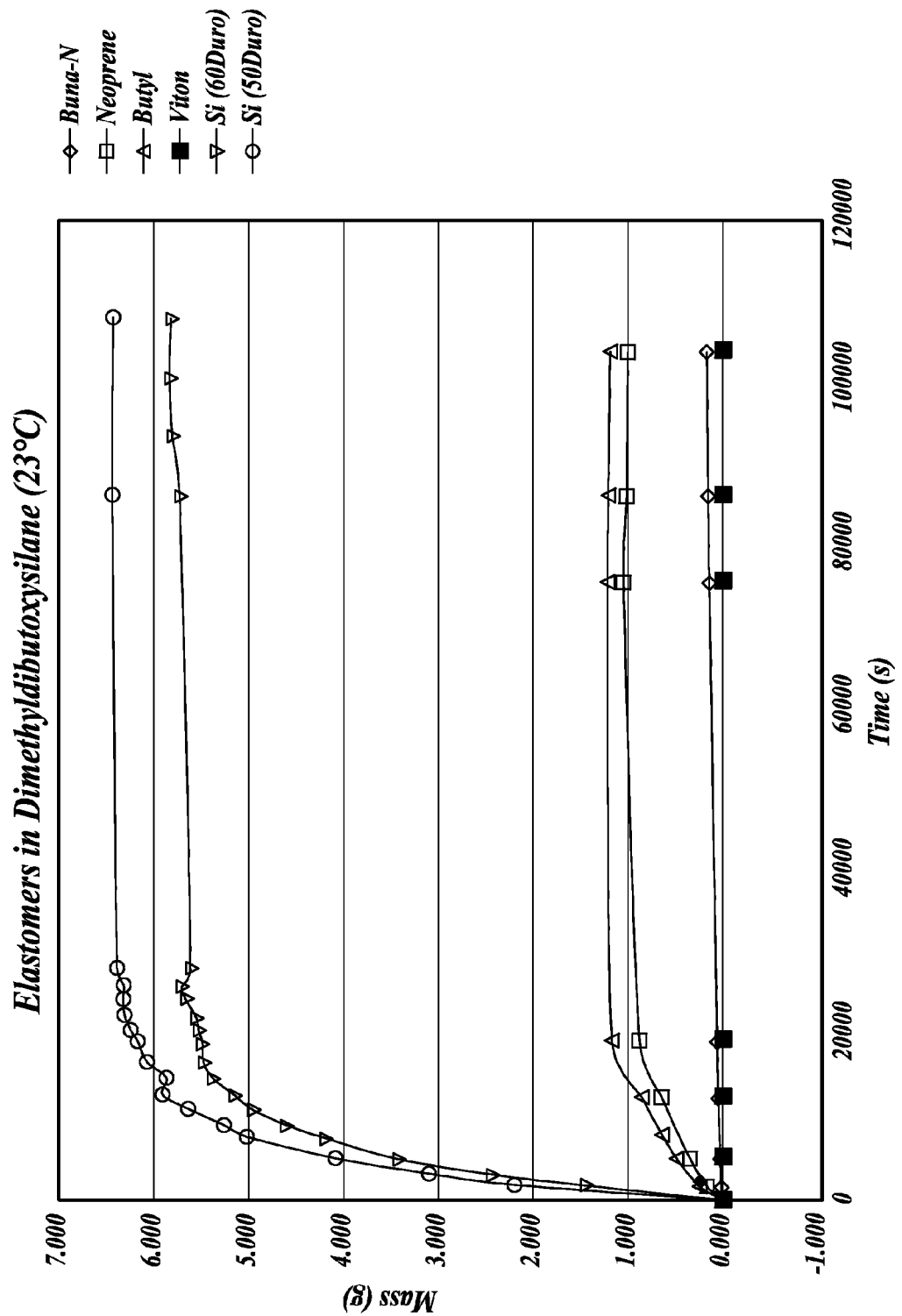
FIG. 7 is a graphical depiction of solubility data recorded for test samples saturated with a first restorative fluid, wherein the solubility data includes the change in mass $(m_2-m_1)$ of the test sample over time(s)
Figure 8:
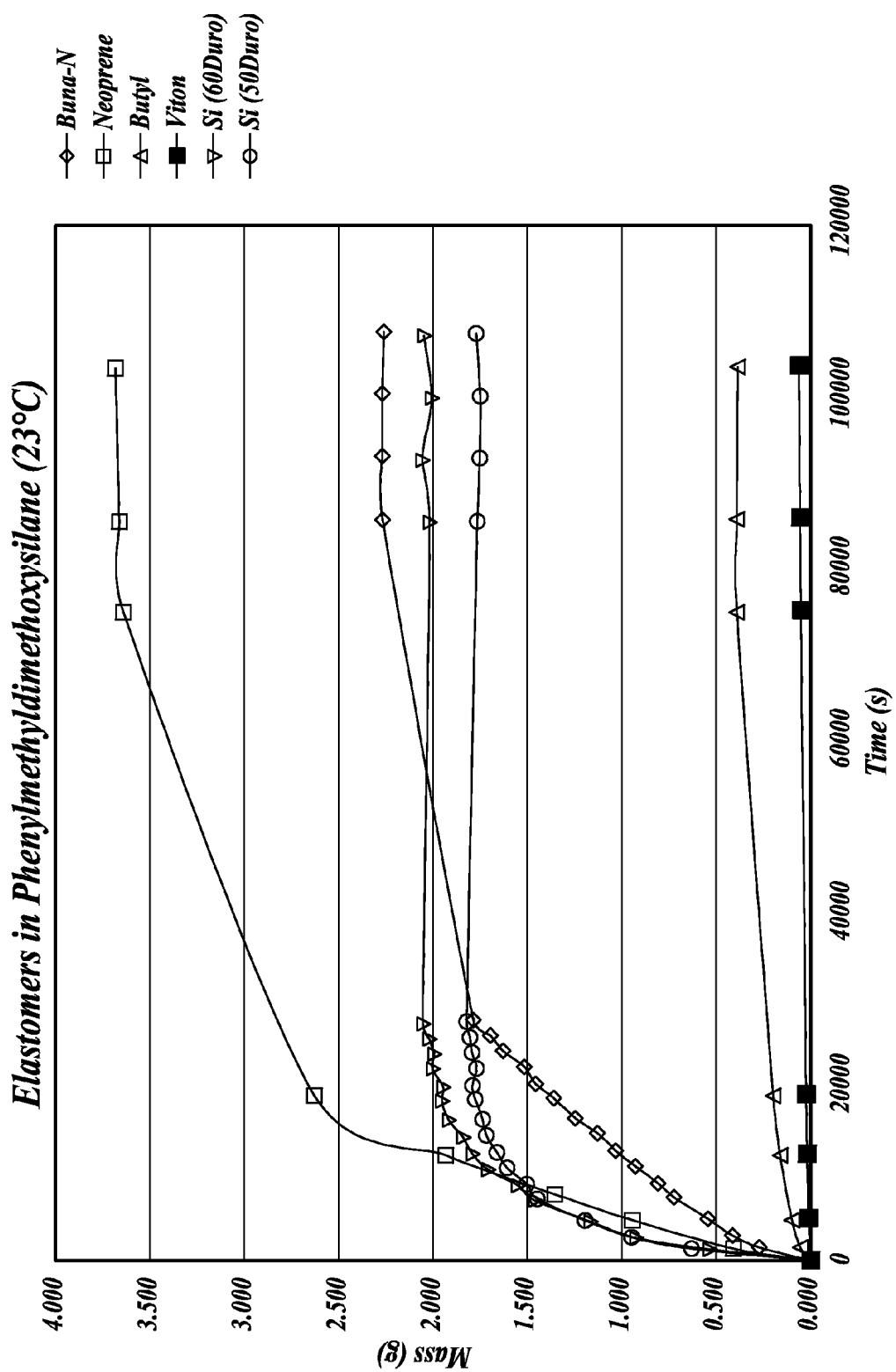
FIG. 8 is a graph of solubility data recorded for test samples saturated with a second restorative fluid, wherein the solubility data includes the change in mass $(m_2-m_1)$ of the test sample over time(s)

The time to half saturation ($time_{1/2}$) is found by plotting the mass increase ($m_2-m_1$) of each sample as a function of time, which is shown in FIGS. 7 and 8.

The solubility (g/cm³) and rate of diffusion (cm²/s) for each test sample in each restorative fluid was calculated using the above equations and is tabulated in TABLES 3 and 4 below.

TABLE 3

Test Samples in Phenylmethyldimethoxysilane (23° C.)

| Material | Solubility (g/cm3) | Diffusivity (cm2/s) | Vol. Change (%) |
|---|---|---|---|
| Buna-N | 0.585 | 7.75E−08 | 54% |
| Neoprene | 0.938 | 1.99E−07 | 88% |
| Butyl Rubber | 0.101 | 5.15E−08 | 8% |
| Viton | 0.015 | 2.89E−08 | 0% |
| Si (60 Duro) | 0.491 | 3.55E−07 | 44% |
| Si (50 Duro) | 0.506 | 3.34E−07 | 40% |

TABLE 4

Test Samples in Dimethyldibutoxysilane (23° C.)

| Material | Solubility (g/cm3) | Diffusivity (cm2/s) | Vol. Change (%) |
|---|---|---|---|
| Buna-N | 0.044 | 3.23E−08 | 4% |
| Neoprene | 0.219 | 1.26E−07 | 11% |
| Butyl Rubber | 0.317 | 1.60E−07 | 34% |
| Viton | 0.000 | 3.10E−08 | 1% |
| Si (60 Duro) | 1.400 | 3.38E−07 | 156% |
| Si (50 Duro) | 1.782 | 2.71E−07 | 150% |

Using the recorded initial and final dimensional data (length, width and thickness), the volume of each test sample before and after exposure to the restorative fluids was calculated and used to determine the percent change (%) in volume, which is shown in TABLES 3 and 4 above. A scatter plot of the percent change in volume (%) versus the rate of diffusion (cm²/s) for each test sample in each of the restorative fluids in each is shown in FIGS. 9 and 10.

Figure 9:
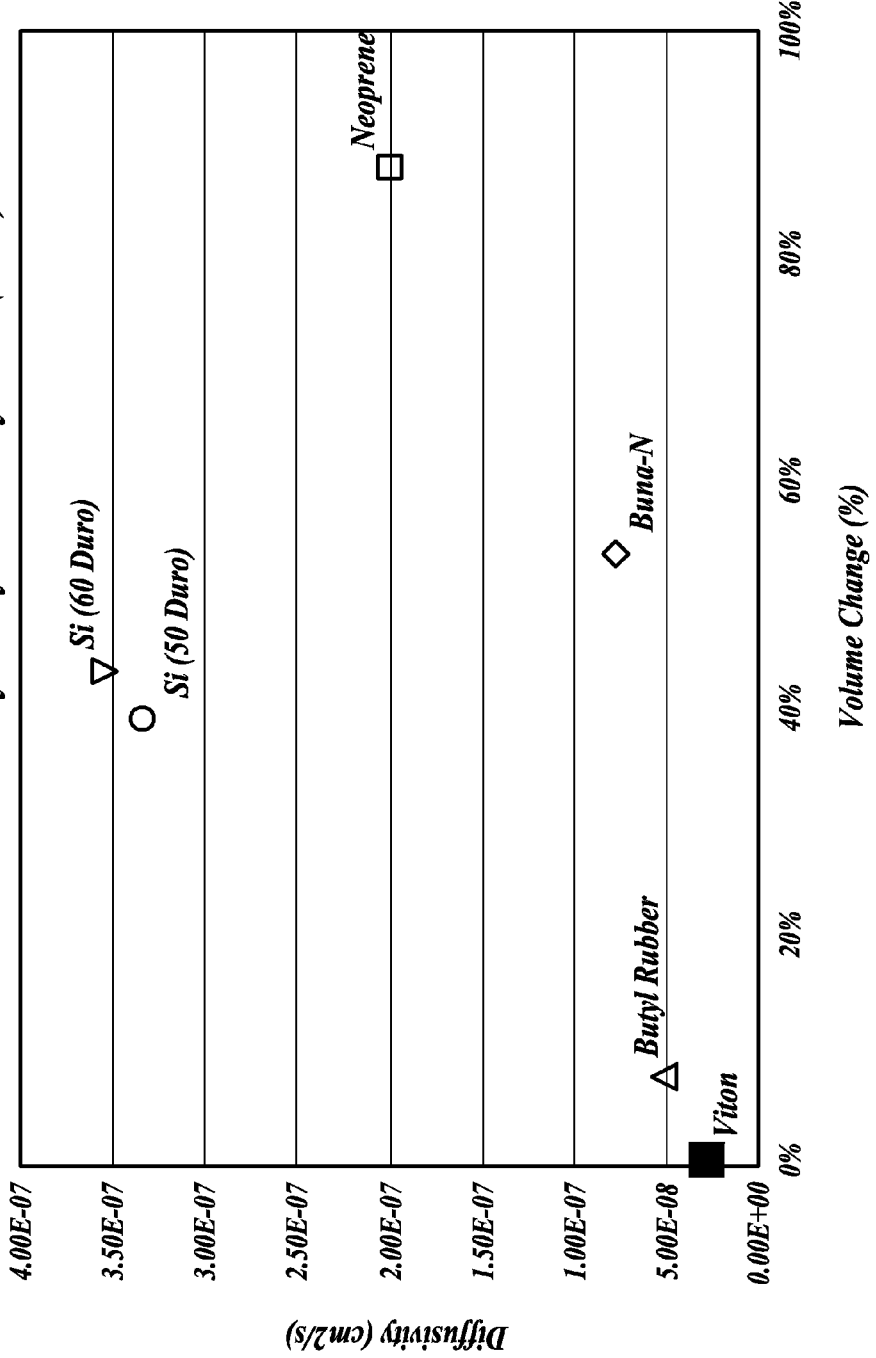
FIG. 9 is a graphical depiction of the percent change in volume (%) versus the rate of diffusion ($cm^2/s$) for test samples saturated with the first restorative fluid.
Figure 10:
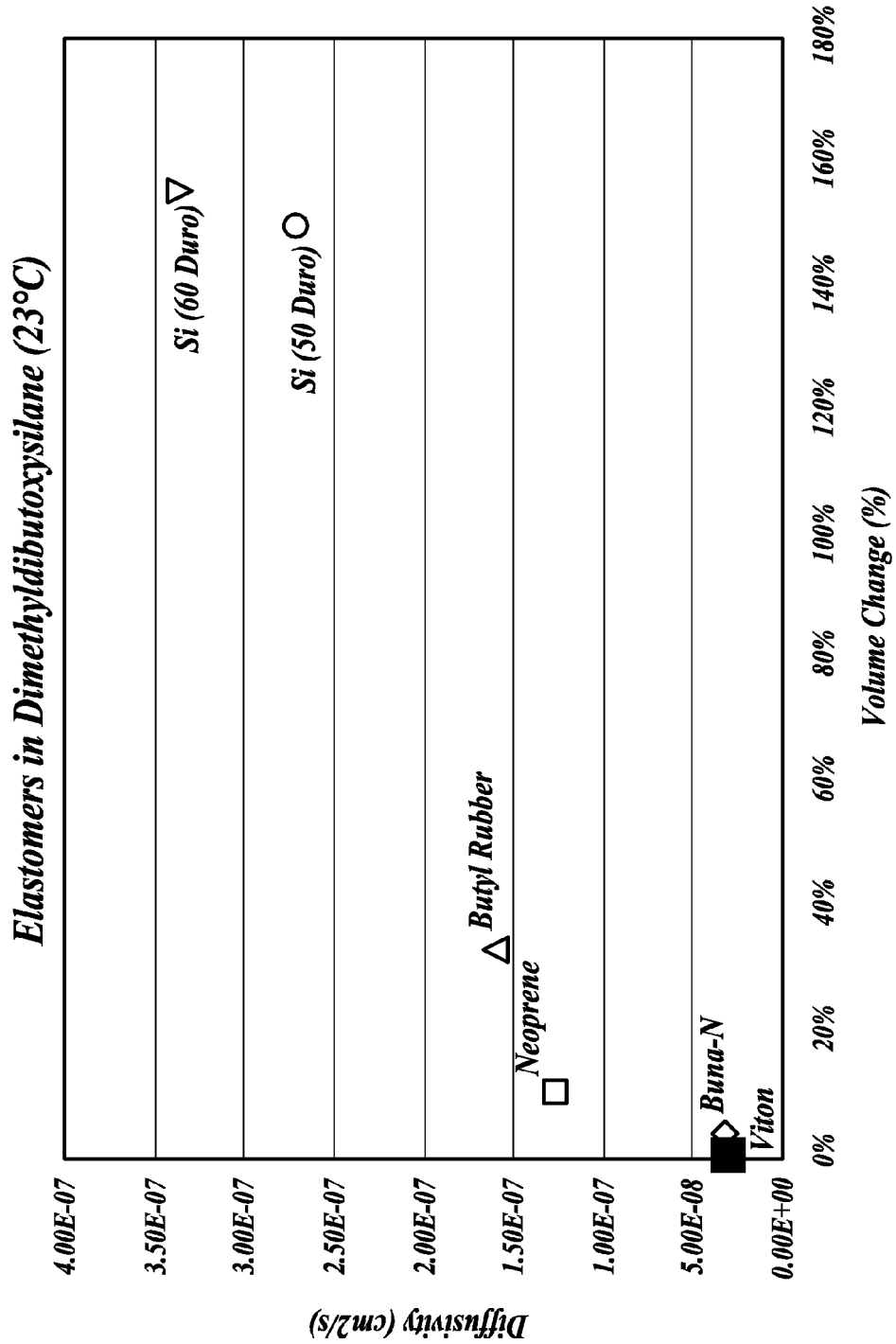
FIG. 10 is a graphical depiction of the percent change in volume (%) versus the rate of diffusion ($cm^2/s$) for test samples saturated with the second restorative fluid.

Based on the results set forth in TABLE 3 and 4 above as well as in FIGS. 9 and 10, the inventors concluded that the solubility and rate of diffusion criteria for an elongated plug 74 in each of the restorative fluids is based on two parts. First, the elongated plug 74 must be made from a material that sufficiently increases in volume, such as by at least about 10%, to mechanically transition the elongated plug 74 into the second configuration to close off flow within the valve assembly 20. In certain embodiments, it is preferred that the elongated plug 74 increase in volume by at least about 20%.

Second, the rate of diffusion of restorative fluid into the elongated plug 74 should be sufficiently high, such as at least about $1\times10^{-7}$ cm²/s, so that the restorative fluids can quickly transition the elongated plug 74 from the first configuration into the second configuration to close off flow within the valve assembly 20.

These criteria were chosen based on the assumption that the elongated plug 74 would be used in a valve assembly 20 for a cable injection setup 24 as described above. In other words, if the elongated plug 74 is made from a material that will increase in volume by at least about 10%, and with a rate of diffusion of at least about $1\times10^{-7}$ cm²/s when exposed to one of the restorative fluids phenylmethyldimethoxysilane or dimethyldibutoxysilane, the elongated plug 74 will perform in an acceptable manner when used in the valve assembly 20 (see also EXPERIMENT 2).

It should be appreciated that the solubility and rate of diffusion criteria for an elongated plug 74 may change if the elongated plug 74 is used in other types of cable injection setups or other types of fluid injection assemblies. For instance, an elongated plug made from a material having a slower rate of diffusion may be acceptable in a cable injection setup where a slow valve assembly closure is desired, similar to a timer. Thus, the results and criteria set forth herein should not be seen as limiting the scope of the present disclosure.

Based on the solubility and rate of diffusion criteria set forth above, the inventors found that when saturated with the restorative fluid phenylmethyldimethoxysilane, the materials neoprene (polychoroprene), silicone rubber (50 Durometer) and silicone rubber (60 Durometer) meet the solubility and rate of diffusion criteria; and therefore, these materials are suitable for the elongated plug 74 in a cable injection setup 24 using the restorative fluid phenylmethyldimethoxysilane. The inventors have also found that when saturated with the restorative fluid dimethyldibutoxysilane, the materials butyl rubber, silicone rubber (50 Durometer), and silicone rubber (60 Durometer) meet the solubility and rate of diffusion criteria; and therefore, these materials are suitable for the elongated plug 74 in a cable injection setup 24 using the restorative fluid dimethyldibutoxysilane.

EXPERIMENT 2

Silicone Rubber (60 Durometer)

To illustrate the benefits of the solubility and rate of diffusion criteria set forth above, the following tests were performed using a valve assembly similar to the valve assembly 20 described above.

The setup for EXPERIMENT 2 included of a fluid feed tank connected to the inlet of a valve assembly. The outlet of the valve assembly was connected through similar tubing to a vacuum tank maintained at −22 inHg.

The valve assemblies were constructed from a fluid column made from Teflon tubing having ¼" outer diameter and ⅛" inner diameter. The material selected for use as the elongated plug was silicone rubber (60 durometer). Silicone rubber (60 durometer) was selected because of its relatively high percentage of volume change (44% and 156%) and rate of diffusion (3.55E−07 $cm^2$/s and 3.38E−07 $cm^2$/s) when exposed to both phenylmethyldimethoxysilane and dimethyldibutoxysilane, respectively. The elongated plug material consisted of 0.10 g of ground silicone rubber with a grain size ranging between 710 and 1000 um.

The ground silicone rubber defining the elongated plug was packed within the fluid column. Mesh screens and roll pins were used to confine the ground silicone to a length of 0.75" and to prevent any longitudinal displacement. A flow meter with a sensitivity of 1 cc/minute was used to monitor the rate at which air displaced fluid in the feed tank. The flow meter was used to determine the time (in seconds) it took for the elongated plug to transition from a first configuration to a second, increased volume configuration to block flow within the valve assembly. The results are shown in TABLE 5 below.

TABLE 5

| Phenylmethyldimethoxysilane (23° C.) | | Dimethyldibutoxysilane (23° C.) | |
|---|---|---|---|
| Trial # | Time (sec.) | Trial # | Time (sec.) |
| 1 | 40 | 1 | 27 |
| 2 | 80 | 2 | 28 |
| 3 | 180 | 3 | 29 |
| 4 | 100 | 4 | 27 |
| 5 | 85 | 5 | 25 |
| Avg. | 97 | Avg. | 27 |

Based on the results show in TABLE 5 above, the inventors determined that silicone rubber (60 durometer), which meets the solubility and rate of diffusion criteria set forth above, performs in an acceptable manner when used in the valve assembly. In other words, the silicone rubber (60 durometer) sufficiently increases in volume to mechanically transition the elongated plug into the second configuration to close off flow within the valve assembly. Moreover, the rate of diffusion of the restorative fluid into the silicone rubber (60 durometer) is sufficiently high so that the elongated plug transitions from the first configuration into the second configuration within an acceptable timeframe.

Returning to FIGS. 3A-3D, the elongated plug 74 may be a single, solid piece of material or a plurality of small pieces of material collected together to define the elongated plug 74. In that regard, if the elongated plug 74 is defined by a plurality of small pieces of material, the elongated plug 74 may be in powder form or the pieces may be granules, such as ground or spherical pieces of material. With the elongated plug 74 being defined by a plurality of small pieces of material, the surface area of the elongated plug 74 is effectively increased. With an increased surface area, the reaction time for the elongated plug 74 to reach the swollen state (such as a 20% increase in volume) when saturated with restorative fluid decreases.

The pieces of the elongated plug 74 (or the single, solid piece) may be secured within the central, longitudinal opening 70 of the column 68 by securing first and second substantially identical end plugs, or sintered plugs 78 and 82 within the opening 70 on opposite ends of the elongated plug 74. The outer diameter of each of the sintered plugs 78 and 82 is substantially equal to the inner diameter of the central, longitudinal opening 70 of the column 68. In this manner, sintered plugs 78 and 82 are press fit within the column 68 and confine the elongated plug 74 in its position.

The sintered plugs 78 and 82 may be well known sintered metal plugs comprised of ground metal particles. In that regard, fluid may flow in a restricted manner through the sintered plugs 78 and 82 by flowing around the particles. The length of the fluid column 68 may be longer than the combined length of the sintered plugs 78 and 82 and the elongated plug 74. As such, "windows" are created on each end of the fluid column 68 to allow the operator to check for fluid and flow through the column 68.

The sintered plugs 78 and 82 allow fluid to flow through the longitudinal opening 70 of the column 68 while retaining the elongated plug 74 within the column 68. Thus fluid may pass through the gap defined between the outer surface of the elongated plug 74 and the inner conduit surface 72 and into the vacuum tank 58. In this manner, the elongated plug 74 becomes saturated with restorative fluid and begins to swell. With the sintered plugs 78 and 82 press fit within the column 68 on opposite ends of the elongated plug 74, the swelling of the elongated plug 74 is limited to the radial direction. In other words, the swelling of the elongated plug 74 does not occur in the longitudinal direction (i.e., the elongated plug 74 does not increase in length). Thus, the sintered plugs 78 and 82 control the direction of the swelling by defining the geometry of the swollen elongated plug 74 to minimize the time required to close the valve assembly 20.

It should be appreciated that instead of the sintered plugs, any other suitable device may be used to secure the elongated plug 74 within the column 68. For instance, if a single, solid piece of material is employed for the elongated plug 74, the elongated plug 74 may be secured within the conduit with roll pins or a similar device. As yet another alternative, if the elongated plug 74 is comprised of a plurality of pieces, the pieces may be confined on either end with a screen, filter, or other type of pass-through device. Thus, the descriptions and illustrations herein should not be seen as limiting the scope of the present disclosure.

The valve assembly 20 may further include a fluid absorbent assembly (not shown) configured to absorb small amounts of fluid drawn into the valve assembly 20 prior to the closure of the valve assembly 20. When the components of the valve assembly 20 and the cable injection setup 24 are cleaned and reused, small amounts of extraneous fluid may remain within the components. The extraneous fluid may be drawn into the fluid column 68 of the valve assembly 20 during the injection process, coming into contact with the elongated pug 74. The extraneous fluid could prematurely transition the elongated plug 74 into the second configuration before the flushed fluid level rises to the upper end of the discard tank 56. It would therefore be useful to dispose a fluid absorbent assembly within the fluid flow path of the valve assembly 20 to help absorb the extraneous fluid prematurely drawn into the valve assembly 20.

The fluid absorbent assembly may include one or more suitable pieces of fluid absorbent material or fluid absorbent devices disposed within the fluid flow path of the valve assembly 20. For instance, first and second pieces of fluid-absorbent material may be disposed within the first and second open ends of the fluid column 68 outside the first and second sintered plugs 78 and 82. In this manner, the first and second pieces of fluid-absorbent material can absorb any extraneous fluid drawn into the fluid column 68 from the discard tank 56 or the vacuum tank 58, respectively, substantially preventing the extraneous fluid from reaching the elongated plug 74.

However, at least the first piece of fluid-absorbent material is configured such that when the flushed fluid level rises within the discard tank 56 and begins flowing within the fluid column 68, the first piece of fluid-absorbent material eventually becomes saturated, and the flushed fluid can flow into contact with the elongated plug 74. In this manner, the elongated plug 74 can transition from the first configuration into the second configuration, closing off the valve assembly 20. The fluid absorbent material or the fluid absorbent device of the fluid absorbent assembly may be any suitable material or device. For instance, the assembly may be embodied as cotton fibers, a cotton ball, a piece of cotton fabric or another absorbent material, desiccant, etc.

Referring specifically to FIGS. 3C and 3D, the operation of the valve assembly 20 will be hereinafter described. FIG. 3C depicts flushed cable fluid flowing into the valve assembly 20. More specifically, the fluid in the discard tank 56 has reached the upper end of the discard tank 56 and has begun to exit the discard tank 56 (see FIG. 2). The fluid flows from the discard tank 56 through the first quick disconnect fitting assembly 62, through the fluid column 68, and through the second quick disconnect fitting assembly 64 toward the vacuum tank 58.

When the elongated plug 74 becomes saturated with restorative fluid, the elongated plug 74 swells in the radial direction, as shown in FIG. 3D. The elongated plug 74 swells in the radial direction until the gap defined between the outer surface of the elongated plug 74 and the inner conduit surface 72 closes, shutting off fluid flow to the vacuum tank 58.

When an operator returns to the cable injection setup 24 and finds the valve assembly 20 closed, the operator may disconnect the equipment from the cable 28 if restoration is complete. If more fluid needs to be injected, the operator may remove the filled discard tank(s) 56 and the closed off valve assembly 20 from the discard/vacuum tank subassembly 36, which can be replaced with an empty discard tank(s) 56 and an unsaturated valve assembly 20. The injection/soak process may then begin again.

The valve assembly 20 provides numerous benefits over the prior art. For instance, the valve assembly 20 will stop the flow of fluid to the vacuum tank 58 when the desired amount of fluid has been flushed from the cable 28. In other words, when the fluid fills the discard tank(s) 56 and reaches the valve assembly 20, the valve assembly 20 closes shortly after the fluid begins flowing from the discard tank 56 to the vacuum tank 58. Thus, the valve assembly 20 reduces the amount of fluid flushed out of the cable 28 and collected in the vacuum tank 58 as waste fluid.

Moreover, if the float valve in the feed tank 32 closes prior to an operator returning to check on the setup, the vacuum source will not create voids in the cable 28 by pulling fluid into the vacuum tank 58. Rather, the valve assembly 20 will close off fluid flow to the vacuum tank 58 when the desired amount of fluid has flushed out of the cable 28.

In contrast to the float valve, the valve assembly 20 is activated or closed when saturated by restorative fluid, rather than being dependent upon vertical orientation. Thus, the valve assembly 20 reduces the reliance on the float valve as a means to terminate the injection.

In instances where both the feed tank 32 and the vacuum tank 58 are left connected to the cable 28, the feed tank 32 is able to continuously supply fluid to the cable 28 under positive pressure. More specifically, when the valve assembly 20 closes, the vacuum tank 58 (and therefore, the vacuum source) is no longer in fluid communication with the cable 28. Thus, the vacuum source is not suctioning fluids from the cable 28.

The fluid feed tank 32 can also be pre-filled with the required amount of fluid for both the injection and soak stages, which increases efficiency and requires less equipment manipulation. In that regard, the discard/vacuum tank subassembly 36 can be configured to include one or more discard tanks 56 to capture as much flushed cable fluid as needed to treat the cable in both the injection and soak stages. In this manner, the operator may simply remove the equipment when returning to the injection setup 24, rather than having to inject more fluid into the cable 28 or flush more fluid from the cable 28.

Referring to FIGS. 4A-4D, 5A-5D, and 6A-6C, alternate embodiments of valve assemblies formed in accordance with the present disclosure are illustrated. The valve assemblies of these alternate embodiments are substantially similar in construction and operation to the valve assembly 20 of FIGS. 3A-3D described above. For the sake of brevity, this detailed description of the alternate embodiments will focus upon the aspects of the valve assemblies of FIGS. 4A-4D, 5A-5D, and 6A-6C which depart from the construction and operation of the previously described valve assembly 20.

Moreover, the valve assemblies of FIGS. 4A-4D, 5A-5D, and 6A-6C are suitable for use with a cable injection setup 24 having a cable 28 extending between and in fluid communication with a fluid feed tank 32 and a discard/vacuum tank subassembly 36, as described above with reference to FIGS. 1 and 2. Therefore, the valve assemblies of FIGS. 4A-4D, 5A-5D, and 6A-6C provide at least the same benefits described above with respect to the valve assembly 20. However, it should be appreciated that the valve assemblies of FIGS. 4A-4D, 5A-5D, and 6A-6C may be used with any suitable cable injection setup.

Referring to FIGS. 4A-4D, a valve assembly 220 formed in accordance with a second exemplary embodiment of the present disclosure will now be described. The valve assembly 220 is disposed between first and second quick disconnect fitting assemblies 240 and 244, which are configured to be selectively placed into fluid communication with the discard tank 56 and the vacuum tank 58, respectively.

The valve assembly 220 includes a fluid column 246 secured between and in fluid communication with the first and second quick disconnect fitting assemblies 240 and 244. The fluid column 246 includes first and second axial openings 248 and 250 defined on opposite open ends of the fluid column 246 that are in fluid communication with fluid passageways of the first and second quick disconnect fitting assemblies 240 and 244 (and/or any fluid conduit connected thereto). The first and second axial openings 248 and 250 intersect first and second transverse openings 252 and 254, respectively. Each end of the first and second transverse openings 252 and 254 extends between and intersects the exterior side surface of the fluid column 246 on opposite sides of the fluid column 246.

A column sleeve 262 is removably receivable on the fluid column 246. The column sleeve 262 includes a central longitudinal opening 264 that is substantially the same shape as the fluid column 246, such as cylindrical. The inner diameter of the central longitudinal opening 264 is slightly larger than the outer diameter of the fluid column 246. In this manner, fluid may flow in a gap defined between the exterior surface of the fluid column 246 and the interior surface of the column sleeve 262 between the first and second transverse openings 252 and 254.

A seal assembly is disposed between the fluid column 246 and the column sleeve 262 to help direct the flow of fluid from the first transverse opening 252 into the second transverse opening 254. The seal assembly also defines a sealed gap between the first and second transverse openings 252 and 254 to help prevent the fluid from leaking out of the valve assembly 220. Although any suitable seal assembly may be used, in the depicted embodiment, the seal assembly includes first and second annular seals 266 and 268, such as O-rings, received within first and second annular grooves 272 and 274 formed within the exterior surface of the fluid column 246.

The first annular groove 272 is formed within the exterior surface of the fluid column 246 between the first transverse opening 252 and the first end of the fluid column 246 that connects with the first quick disconnect fitting assembly 240. Similarly, the second annular groove 274 is formed within the exterior surface of the fluid column 246 between the second transverse opening 254 and the second end of the fluid column 246 that connects with the second quick disconnect fitting assembly 244.

The first and second annular grooves 272 and 274 are also positioned axially on the fluid column 246 such that they are both covered by the column sleeve 262 when it is received on the fluid column 246. When the first and second annular seals 266 and 268 are received within the first and second annular grooves 272 and 274, the first and second annular seals 266 and 268 form a fluid-tight seal between the fluid column 246 and the column sleeve 262.

Referring to FIG. 4C, the valve assembly 220 defines a fluid flow path that extends from the first axial opening 248 of the fluid column 246, into the first transverse opening 252 of the fluid column 246, into the gap defined between the exterior surface of the fluid column 246 and the interior surface of the column sleeve 262, into the second transverse opening 254 of the fluid column 246, and into the second axial opening 250 of the fluid column 246. In that regard, fluid flows through the valve assembly 220 in the following manner. Fluid flows from the discard tank 56 to the first quick disconnect fitting assembly 240, through the first axial opening 248, into the first transverse opening 252, into the gap defined between the exterior surface of the fluid column 246 and the interior surface of the column sleeve 262, into the second transverse opening 254, into the second axial opening 250, and thereafter into the second quick disconnect fitting assembly 244 and to the vacuum tank 58.

The valve assembly 220 includes a saturation valve portion that closes off fluid flow within the valve assembly 220 when saturated with restorative fluid. The saturation valve portion is disposed within the fluid flow path of the valve assembly 220, and the saturation valve portion is in a first configuration when no restorative fluid is flowing through the flow path to allow fluid to continue flowing through the valve assembly 220. The saturation valve portion transitions into a second configuration when restorative fluid flows through the flow path of the valve assembly 220 to close off flow within the valve assembly 220.

The saturation valve portion is defined by an annular plug 276 received within a third annular groove 278. In the first configuration, the annular plug 276 is a first volume that is defined by a sufficiently small cross-sectional diameter such that it initially does not create a seal between the fluid column 246 and the column sleeve 262. In the alternative or in addition thereto, the third annular groove 278 may be deeper than the first and second annular grooves 272 and 274 such that the annular plug 276 is seated deeper within the third annular groove 278; and therefore, it does not engage and seal with the interior surface of the column sleeve 262. With the annular plug 276 disengaged with the interior surface of the column sleeve 262, fluid may flow through the valve assembly 220 as described above.

The annular plug 276 is made from a material that is incompatible with restorative fluid, similar to the elongated plug 74 of valve assembly 20. Specifically, the annular plug 276 transitions to the second configuration by swelling or increasing in volume when it is saturated by restorative fluid.

The annular plug 276 swells or increases in volume when saturated by restorative fluid to eventually close off the gap defined between the exterior surface of the fluid column 246 and the interior surface of the column sleeve 262. In this manner, when the fluid rises to the upper end of the discard tank 56 and begins flowing through the valve assembly 220, the annular plug 276 will close the valve assembly 220, shutting off all fluid flow between the discard tank 56 and the vacuum tank 58.

The width of the third annular groove 278 (defined by its sidewalls) combined with the gap defined between the bottom, interior surface of the third annual groove 278 and the interior surface of the column sleeve 262 controls the time required for the valve assembly 220 to close once the annular plug 276 is saturated with restorative fluid. In that regard, the outer diameter of the fluid column 246 and/or the inner diameter of the column sleeve 262 may be increased or decreased to control the time required for the annular plug 276 to close the gap therebetween. The depth and width of the third annular groove 278 may also be increased or decreased to control the direction in which the annular plug 276 expands as well as the surface area of the annular plug 276 exposed to restorative fluid; and therefore, the rate at which it closes the gap. Moreover, the cross-sectional thickness of the annular plug 276 may be increased or decreased to change the rate at which the gap closes. Thus, it should be appreciated that the valve assembly 220 may be customized to meet specific design parameters.

After the annular plug 276 swells and closes off the valve assembly 220, the annular plug 276 may be removed and replaced with an unsaturated annular plug so that the valve assembly 220 may be reused for another injection fluid discard process. In that regard, the column sleeve 262 is slidable longitudinally and axially along the fluid column 226 such that the annular plug 276 may be accessed.

A suitable locking assembly is used to removably secure the column sleeve 262 in a closed, locked position on the fluid column 246; i.e., with the first and second annular seals 266 and 268 sealed between the fluid column 246 and the column sleeve 262 (see FIGS. 4C and 4D). In the depicted embodiment, the locking assembly includes first and second locking members 282 and 284 receivable within first and second annular locking channels 286 and 288 defined on each end of the fluid column 246. The first and second locking members 282 and 284 are sized and shaped to extend radially outward of the locking channels 286 and 288 so as to block longitudinal, axial movement of the column sleeve 262 in the locked position. The first and second locking members 282 and 284 may be any suitable device, a few suitable examples being a snap ring or clip.

To transition the column sleeve 262 from the locked position to an unlocked position, the second locking member 284 is simply removed from the second annular locking channel 288 as shown in FIG. 4B, permitting the column sleeve 262 to slide past the second annular locking channel 288. In the alternative, the first locking member 282 may instead be removed from the first annular locking channel 286, allowing the column sleeve 262 to slide past the first annular locking channel 286.

Further, it should also be noted, although the locking assembly is shown and illustrated with specific structures for locking the column sleeve 262 in either the locked or unlocked position, other structures may be used to hold the column sleeve 262 in either the locked or unlocked position, a few suitable examples being ball and detent systems, twist-to-lock structures, threaded connections, bayonet style locking mechanisms, fasteners, etc.

Referring to FIGS. 5A-5D, a valve assembly 320 formed in accordance with a third exemplary embodiment of the present disclosure will now be described. The valve assembly 320 is disposed between first and second quick disconnect fitting assemblies 340 and 344, which are configured to be selectively placed into fluid communication with the discard tank 56 and the vacuum tank 58, respectively.

The valve assembly 320 includes a fluid column 346 and a column sleeve 362. The fluid column 346 is secured to and is in fluid communication with the first quick disconnect fitting assembly 340 at its first end, and the column sleeve 362 is secured to and is in fluid communication with the second quick disconnect fitting assembly 344 at its second end. Moreover, the second end of the fluid column 346 is received within the first end of the column sleeve 362.

The fluid column 346 includes first and second axial openings 348 and 350 defined on opposite open ends of the fluid column 346 that are in fluid communication with fluid passageways of the first and second quick disconnect fitting assemblies 340 and 344 (and/or any fluid conduit connected thereto). The first and second axial openings 348 and 350 intersect first and second transverse openings 352 and 354, respectively. Each of the first and second transverse openings 352 and 354 extends between and intersects the exterior side surface of the fluid column 346 on opposite sides of the fluid column 346.

The column sleeve 362 is removably receivable on the fluid column 346. The column sleeve 362 includes a central longitudinal opening 364 that is substantially the same shape as the fluid column 346, such as cylindrical. The inner diameter of the central longitudinal opening 364 is slightly larger than the outer diameter of the fluid column 346. In this manner, fluid may flow in a gap defined between the exterior surface of the fluid column 346 and the interior surface of the column sleeve 362 between the first and second transverse openings 352 and 354.

A seal assembly is disposed between the fluid column 346 and the column sleeve 362 to help direct the flow from the first transverse opening 352 into the second transverse opening 354. The seal assembly also prevents the fluid from leaking out of the valve assembly 320. Although any suitable seal assembly may be used, in the depicted embodiment, the seal assembly includes a first annular seal 366, such as an O-ring, received within a first annular groove 372 formed within the exterior surface of the fluid column 346.

The first annular groove 372 is formed within the exterior surface of the fluid column 346 between the first transverse opening 352 and the first end of the fluid column 346. The first annular groove 372 is also positioned axially on the fluid column 346 such that it is covered by the column sleeve 362 when it is received on the fluid column 346, forming a fluid-tight seal between the first end of the fluid column 346 and the first end of the column sleeve 362.

The fluid column 346 defines a reduced diameter portion 384 near its second end that is receivable within a correspondingly sized bore 368 defined within the interior of the column sleeve 362. The reduced diameter portion 384 includes external threads that are engageable with internal threads defined within the bore 368. The threaded connection between the reduced diameter portion 384 and the bore 368 removably secures the column sleeve 362 on the fluid column 346. In that regard, the threaded connection also defines a locking assembly for selectively locking the column sleeve 362 on the fluid column 346.

The fluid column 346 includes an enlarged annular end 382 defined at its first end (opposite the reduced diameter section 384). A transverse shoulder (not labeled) is defined between the enlarged annular end 382 and the body of the fluid column 346 that is abuttable by the first end of the column sleeve 362 when the column sleeve 362 is fully threaded onto the fluid column 346. With the column sleeve 362 fully threaded onto on the fluid column 346, a fluid-tight seal is defined between the fluid column 346 and the column sleeve 362 at the first annular seal 366 (see FIGS. 5C and 5D).

The column sleeve 362 includes additional internal threads within its second open end that are engageable with external threads on the second quick disconnect fitting assembly 344 (not shown). The threaded connection between the column sleeve 362 and the second quick disconnect fitting assembly 344 forms a fluid-tight seal between the column sleeve 362 and the second quick disconnect fitting assembly 344. A suitable adhesive may optionally be applied to the internal or external threads before threading the second quick disconnect fitting assembly 344 within the column sleeve 362 to enhance the fluid-tight seal therebetween.

Referring to FIG. 4C, the valve assembly 320 defines a fluid flow path that extends from the first axial opening 348 of the fluid column 346, into the first transverse opening 352 of the fluid column 346, into the gap defined between the exterior surface of the fluid column 346 and the interior surface of the column sleeve 362, into the second transverse opening 354 of the fluid column 346, and into the second axial opening 350 of the fluid column 346. In that regard, fluid flows through the valve assembly 320 in the following manner. Fluid flows from the discard tank 56 to the first quick disconnect fitting assembly 340, through the first axial opening 348, into the first transverse opening 352, into the gap defined between the exterior surface of the fluid column 346 and the interior surface of the column sleeve 362, into the second transverse opening 354, into the second axial opening 350, and thereafter into the second quick disconnect fitting assembly 344 and to the vacuum tank 58.

The valve assembly 320 includes a saturation valve portion that closes off flow in the valve assembly 320 when saturated by restorative fluid. The saturation valve portion is disposed within the fluid flow path of the valve assembly 320, and the saturation valve portion is in a first configuration when no restorative fluid is flowing through the flow path to allow fluid to continue flowing through the valve assembly 320. The saturation valve portion transitions into a second configuration when restorative fluid flows through the flow path of the valve assembly 320 to close off flow within the valve assembly 320.

The saturation portion is defined by an annular plug 376 received within a second annular groove 378. In the first configuration, the annular plug 376 is a first volume defined by a sufficiently small cross-sectional diameter such that it initially does not create a seal between the fluid column 346 and the column sleeve 362. In the alternative or in addition thereto, the second annular groove 378 may be deeper than the first annular groove 372 such that the annular plug 376 is seated deeper within the second annular groove 378; and therefore, it does not engage and seal with the interior surface of the column sleeve 362. With the annular plug 376 disengaged with the interior surface of the column sleeve 362, fluid may flow through the valve assembly 320 as described above.

The annular plug 376 is made from a material that is incompatible with the restorative fluid, similar to the elongated plug 74 of valve assembly 20. Specifically, the annular plug 376 transitions into the second configuration by swelling or increasing in volume when it is saturated by restorative fluid.

The annular plug 376 swells or increases in volume when saturated by the restorative fluid to eventually close off the gap defined between the exterior surface of the fluid column 346 and the interior surface of the column sleeve 362. In this manner, when the fluid rises to the upper end of the discard tank 56 and begins flowing through the valve assembly 320, the annular plug 376 will close the valve assembly 320, shutting off all fluid flow between the discard tank 56 and the vacuum tank 58.

The width of the second annular groove 378 (defined by its sidewalls) combined with the gap defined between the bottom, interior surface of the second annual groove 378 and the interior surface of the column sleeve 362 controls the time required for the valve assembly 320 to close once the annular plug 376 is saturated with restorative fluid. In that regard, the outer diameter of the fluid column 346 and/or the inner diameter of the column sleeve 362 may be increased or decreased to control the time required for the annular plug 376 to close the gap therebetween. The depth and width of the second annular groove 378 may also be increased or decreased to control the direction in which the annular plug 376 expands as well as the surface area of the annular plug 376 exposed to restorative fluid; and therefore, the rate at which it closes the gap. Moreover, the cross-sectional thickness of the annular plug 376 may be increased or decreased to change the rate at which the gap closes. Thus, it should be appreciated that the valve assembly 320 may be customized to meet specific design parameters.

After the annular plug 376 swells and closes off the valve assembly 320, the annular plug 376 may be removed and replaced with an unsaturated annular plug so that the valve assembly 320 may be reused for another injection fluid discard process. In that regard, the column sleeve 362 may be unthreaded from the fluid column 346 to access the annular plug 376.

Figure 6A:
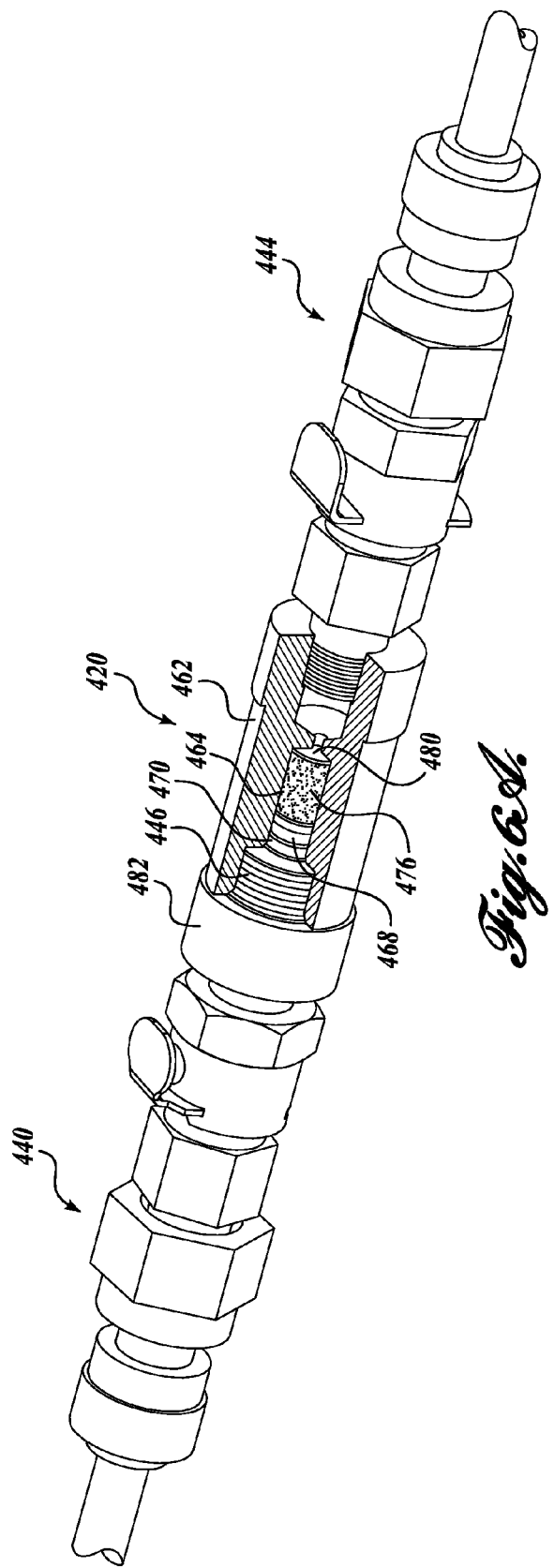
FIG. 6A is an isometric partially broken away view of a fourth embodiment of a valve assembly disposed between the first and second connector fitting assemblies.

Referring to FIGS. 6A-6C, a valve assembly 420 formed in accordance with a fourth exemplary embodiment of the present disclosure will now be described. The valve assembly 420 is disposed between first and second quick disconnect fitting assemblies 440 and 444, which are configured to be selectively placed into fluid communication with the discard tank 56 and the vacuum tank 58, respectively.

The valve assembly 420 includes a fluid column 446 and a column sleeve 462, each having first and second open ends. The fluid column 446 is secured to and is in fluid communication with the first quick disconnect fitting assembly 440 at its first end, and the column sleeve 462 is secured to and is in fluid communication with the second quick disconnect fitting assembly 444 at its second end. Moreover, the second end of the fluid column 446 is received within the first end of the column sleeve 462.

The fluid column 446 includes a first longitudinal axial opening 448 that is in fluid communication with the fluid passageway of the first quick disconnect fitting assembly 440 (and/or any fluid conduit connected thereto). The first longitudinal axial opening 448 of the fluid column 446 is also in fluid communication with a second longitudinal axial opening 450 defined within the column sleeve 462, wherein the second longitudinal axial opening 450 is in fluid communication with the fluid passageway of the second quick disconnect fitting assembly 444 (and/or any fluid conduit connected thereto).

The second end of the fluid column 446 defines a reduced diameter portion 470 that is receivable within a bore 464 defined within the interior of the column sleeve 462. The bore 464 is in fluid communication with the second longitudinal axial opening 450 through a fluid passageway 466.

A seal assembly is disposed between the reduced diameter portion 470 of the fluid column 446 and the column sleeve 462 to form a fluid-tight seal therebetween. Although any suitable seal assembly may be used, in the depicted embodiment, the seal assembly includes an annular seal 468, such as an O-ring, received within an annular groove 474 formed within the exterior surface of the reduced diameter portion 470.

The valve assembly 420 includes a saturation valve portion that close off flow in the valve assembly 420 when saturated with restorative fluid. The saturation valve portion is disposed within a fluid flow path of the valve assembly 420, and the saturation valve portion is in a first configuration when no restorative fluid is flowing through the flow path to allow fluid to continue flowing through the valve assembly 420. The saturation valve portion transitions into a second configuration when restorative fluid flows through the flow path of the valve assembly 420 to close off flow within the valve assembly 420.

The saturation valve portion is defined by a disc 476 received within the bore 464 of the column sleeve 462. The disc 476 is defined by a plurality of pieces of material that may be in powder form or granules such as ground or spherical pieces, etc. The pieces of the disc 476 are made from a material that is incompatible with the restorative fluid, similar to the elongated plug 74 of valve assembly 20. Specifically, the disc 476 transitions from the first configuration to the second configuration by swelling or increasing in volume when it is saturated by restorative fluid.

The pieces of the disc 476 are secured within the bore 464 of the column sleeve 462 by first securing a filter 480 within the bore 464. The filter 480 may be the same size, shape, and diameter as the bore 464 to help ensure that no pieces of the disc 476 pass into the second longitudinal axial opening 450 when fluid is flowing.

With the filter 480 received within the bore 464, loose pieces material may be packed into the bore 464 to define the disc 476. In the alternative, the disc may be pre-assembled with the pieces secured together to define the disc 476, but with gaps and fluid pathways defined within the disc 476 in the first configuration such that fluid may initially flow therethrough. After securing the disc 476 within the bore 464, the reduced diameter portion 470 of the fluid column 446 may be secured within the bore 464, sandwiching the disc 476 between the reduced diameter portion 470 and the filter 480.

Referring to FIGS. 6B and 6C, fluid flows through the fluid flow path of the valve assembly 420 in the following manner. Fluid flows from the discard tank 56 to the first quick disconnect fitting assembly 440, through the first axial opening 448 of the fluid column 446, though the disc 476 and the filter 480 within the bore 464, through the fluid passageway 466 of the fluid column 462, into the second axial opening 450 of the fluid column 446, and thereafter into the second quick disconnect fitting assembly 444 and to the vacuum tank 58. The pieces of the disc 476 swell or increase in volume when saturated by restorative fluid. With the pieces of the disc 476 increasing in volume, the density of the disc 476 increases until it eventually becomes solid to close off the fluid flow path between the first axial opening 448 and the second axial opening 450. In this manner, when the fluid rises to the upper end of the discard tank 56 and begins flowing through the valve assembly 420, the disc 476 will close the valve assembly 420, shutting off all fluid flow between the discard tank 56 and the vacuum tank 58.

After the pieces of the disc 476 swell and closes off the valve assembly 420, the disc 476 may be removed and replaced with an unsaturated disc so that the valve assembly 420 may be reused for another injection fluid discard process. In that regard, the column sleeve 462 is removably secured on the fluid column 426 through a suitable locking assembly such that the disc 476 may be accessed.

Although the column sleeve 462 may be removably secured on the fluid column 446 in any suitable manner, in the depicted embodiment, the column sleeve 462 includes internal threads that are engageable with external threads formed on the fluid column 446. More specifically, external threads are formed on the exterior surface of the fluid column 446 between the reduced diameter portion 470 and an enlarged annular end 482 defined at its first end (opposite the reduced diameter section 470). Internal threads are formed within the first open end of the column sleeve 462 that are engageable with the external threads of the fluid column 446. The column sleeve 462 is threaded onto the fluid column 446 to define a threaded connection therebetween.

The threaded connection between the column sleeve 462 and the fluid column 446 defines as a locking assembly for selectively locking the column sleeve 462 on the fluid column 446. At the same time, the threaded connection forms a fluid-tight seal between the fluid column 446 the column sleeve 462. A suitable adhesive may optionally be applied to the internal or external threads before threading the column sleeve 462 on the fluid column 446 to enhance the fluid-tight seal therebetween.

A transverse shoulder (not labeled) is defined between the enlarged annular end 482 of the fluid column 446 and the body of the fluid column 446. The transverse shoulder is abuttable by the first end of the column sleeve 462 when the column sleeve 462 is fully threaded onto the fluid column 446. With the column sleeve 462 fully threaded onto the fluid column 446, a fluid-tight seal is defined between the fluid column 446 and the column sleeve 462 at the threaded connection and at the annular seal 468 (see FIGS. 6C and 6D).

While illustrative embodiments have been illustrated and described, it should be appreciated that the above-described valve assemblies are exemplary only, and each of the valve assemblies described above may be modified to include one or more features of one of the other valve assemblies. Moreover, various changes may be made to each of the valve assemblies without departing from the spirit and scope of the present disclosure.

For instance, a valve assembly may include a saturation valve portion defined by an O-ring received within an annular groove formed on an interior surface of a conduit. Fluid may flow through the conduit and the central opening in the O-ring, and the valve assembly may close upon the swelling of the O-ring, causing the central opening of the O-ring to close.

In another non-limiting example, a valve assembly may include a saturation valve portion defined by a plug received within a reservoir that is positioned below a dip tube, wherein the dip tube is configured to release cable fluid. The plug would swell upon saturation from the fluid and make contact within the bottom opening of the dip tube. Upon making contact with the dip tube, the plug would close off flow.

Thus, it can be appreciated that aspects of the present disclosure have wide application, and the foregoing descriptions and illustrations provided herein should be considered illustrative in nature, and thus, not limiting in scope.

The embodiments of the present disclosure in which an exclusive property or privilege is claimed are defined as follows:

1. A valve assembly configured to close off the flow of fluid within a fluid injection assembly, the valve assembly comprising:
    (a) a fluid column having a first open end and a second open end;
    (b) a fluid flow path defined between the first and second open ends of the fluid column; and
    (c) a saturation valve portion disposed within the fluid flow path, wherein the saturation valve portion is a first configuration when no fluid is flowing through the fluid flow path, and wherein the saturation valve portion transitions to a second configuration when fluid is flowing through the fluid flow path, wherein the saturation valve portion is formed from a material selected from the group consisting of silicone rubber, nitrile rubber, polychoroprene, butyl rubber, and fluoroelastomer, and any combination thereof.

2. The valve assembly of claim 1, wherein the saturation valve portion substantially closes off flow within the fluid flow path in the second configuration.

3. The valve assembly of claim 1, wherein the fluid flow path is defined by a longitudinal axial opening of the fluid column.

4. The valve assembly of claim 3, wherein the saturation valve portion is an elongated plug, and in the first configuration the elongated plug has an external diameter that is less than an internal diameter of the longitudinal axial opening of the fluid column, and in the second configuration the elongated plug has an external diameter that is substantially equal to the internal diameter of the longitudinal axial opening of the fluid column.

5. The valve assembly of claim 4, further comprising first and second end plugs received within the longitudinal axial opening of the fluid column on opposing ends of the elongated plug, wherein the first and second end plugs are configured to allow fluid to pass therethrough while limiting the transition of the elongated plug between the first and second configurations to the radial direction.

6. The valve assembly of claim 1, wherein the fluid flow path is further defined by a first transverse opening in fluid communication with the first open end of the fluid column, a second transverse opening in fluid communication with the second open end of the fluid column, and a sealed gap extending between the first and second transverse openings.

7. The valve assembly of claim 1, wherein the saturation valve portion is in one of granule and powder form.

8. The valve assembly of claim 1, wherein the saturation valve portion increases in volume by at least 10% in the second configuration.

9. The valve assembly of claim 1, wherein the saturation valve portion increases in volume by at least 20% in the second configuration.

10. The valve assembly of claim 8 or 9, wherein the saturation valve portion is formed from a material having a rate of diffusion of at least $1 \times 10^{-7}$ cm$^2$/s.

11. The valve assembly of claim 1, further comprising a fluid absorbent assembly disposed within the fluid flow path.

12. A discard/vacuum tank subassembly, comprising:
    (a) a discard tank configured to receive fluid from a source;
    (b) a valve assembly, comprising:
        (i) a fluid column having a first open end and a second open end, the first open end in fluid communication with the discard tank and configured to receive fluid from the discard tank when fluid within the discard tank reaches a predetermined threshold;
(ii) a fluid flow path defined between the first and second open ends of the fluid column;
(iii) a saturation valve portion disposed within the fluid flow path, wherein the saturation valve portion is a first configuration when no fluid is flowing through the fluid flow path, and wherein the saturation valve portion transitions to a second configuration when fluid is flowing through the fluid flow path; and
(c) a vacuum tank in fluid communication with the second open end of the fluid column.

13. The discard/vacuum tank subassembly of claim 12, wherein the saturation valve portion substantially closes off flow within the fluid flow path in the second configuration.

14. The discard/vacuum tank subassembly of claim 12, wherein the fluid flow path is defined by a longitudinal axial opening of the fluid column.

15. The discard/vacuum tank subassembly of claim 14, wherein the saturation valve portion is an elongated plug, and in the first configuration the elongated plug has an external diameter that is less than an internal diameter of the longitudinal axial opening of the fluid column, and in the second configuration the elongated plug has an external diameter that is substantially equal to the internal diameter of the longitudinal axial opening of the fluid column.

16. The discard/vacuum tank subassembly of claim 15, further comprising first and second end plugs received within the longitudinal axial opening of the fluid column on opposing ends of the elongated plug, wherein the first and second end plugs are configured to allow fluid to pass therethrough while limiting the transition of the elongated plug between the first and second configurations to the radial direction.

17. The discard/vacuum tank subassembly of claim 16, wherein the fluid flow path is further defined by a first transverse opening in fluid communication with the first open end of the fluid column, a second transverse opening in fluid communication with the second open end of the fluid column, and a sealed gap extending between the first and second transverse openings.

18. The discard/vacuum tank subassembly of claim 17, further comprising a column sleeve disposed over the fluid column, wherein an internal diameter of the column sleeve is larger than an external diameter of the fluid column to define the sealed gap extending between the first and second transverse openings.

19. The discard/vacuum tank subassembly of claim 18, wherein the saturation valve portion is an O-ring disposed between the first and second transverse openings on an exterior surface of the fluid column.

20. The discard/vacuum tank subassembly of claim 19, wherein the O-ring is disposed within an annular groove defined within the exterior surface of the fluid column.

21. The discard/vacuum tank subassembly of claim 18, wherein the column sleeve is moveable on the fluid column between a first position, wherein the column sleeve defines the sealed gap extending between the first and second transverse openings, and a second position.

22. The discard/vacuum tank subassembly of claim 21, further comprising a locking assembly for selectively locking the column sleeve in the first position.

23. The discard/vacuum tank subassembly of claim 12, further comprising a column sleeve securable to the fluid column, the column sleeve having a longitudinal axial opening at a first end, a bore at a second end, and a fluid passageway extending between the longitudinal axial opening and the bore.

24. The discard/vacuum tank subassembly of claim 23, wherein the fluid flow path extends within the longitudinal axial opening, the fluid passageway, and the bore of the column sleeve when the column sleeve is secured to the fluid column.

25. The discard/vacuum tank subassembly of claim 24, wherein the saturation valve portion is disposed within the bore of the column sleeve.

26. The discard/vacuum tank subassembly of claim 12, wherein the saturation valve portion is in one of granule and powder form.

27. The discard/vacuum tank subassembly of claim 12, wherein the saturation valve portion increases in volume by at least 10% in the second configuration.

28. The discard/vacuum tank subassembly of claim 12, wherein the saturation valve portion increases in volume by at least 20% in the second configuration.

29. The discard/vacuum tank subassembly of claim 27 or 28, wherein the saturation valve portion is formed from a material having a rate of diffusion of at least $1 \times 10^{-7}$ cm$^2$/s.

30. The discard/vacuum tank subassembly of claim 12, wherein the saturation valve portion is formed from a material selected from the group consisting of silicone rubber, nitrile rubber, polychoroprene, butyl rubber, and fluoroelastomer, and any combination thereof.

31. The discard/vacuum tank subassembly of claim 12 or 30, wherein fluid flowing through the fluid flow path is selected from the group consisting of phenylmethyldimethoxysilane, dimethyldimethoxysilane, trimethylmethoxysilane, dimethyldibutoxysilane, tolylethylmethyldimethoxysilane, dimethoxymethyl[2-(methylphenyl)ethyl]silane, cyanobutylmethyldimethoxysilane, 2-(4-methylphenethyl)methylbis(2-ethylhexoxy)silane, di(2-ethylhexoxy)methyl[2-(methylphenyl)ethyl]silane, 3-cyanobutylmethylbis(2-ethylhexoxy)silane, and acetephenone, and any combination thereof.

32. The discard/vacuum tank subassembly of claim 12, further comprising a fluid absorbent assembly disposed within the fluid flow path of the valve assembly.

33. A fluid injection assembly, comprising:
(a) a cable having first and second ends;
(b) a fluid feed tank in communication with the first end of the cable and configured to inject fluid into the cable;
(c) a discard tank in communication with the second end of the cable and configured to receive fluid flushed from the cable;
(d) a valve assembly, comprising:
(i) a fluid column having a first open end and a second open end, the first open end in fluid communication with the discard tank and configured to receive fluid from the discard tank when fluid within the discard tank reaches a predetermined threshold;
(ii) a fluid flow path defined between the first and second open ends of the fluid column;
(iii) a saturation valve portion disposed within the fluid flow path, wherein the saturation valve portion is a first configuration when no fluid is flowing through the fluid flow path, and wherein the saturation valve portion transitions to a second configuration when fluid is flowing through the fluid flow path; and
(e) a vacuum tank in fluid communication with the second open end of the fluid column.

34. The fluid injection assembly of claim 33, wherein the saturation valve portion substantially closes off flow within the fluid flow path in the second configuration.

35. The fluid injection assembly of claim 33, wherein the fluid flow path is defined by a longitudinal axial opening of the fluid column.

36. The fluid injection assembly of claim 35, wherein the saturation valve portion is an elongated plug, and in the first configuration the elongated plug has an external diameter that is less than an internal diameter of the longitudinal axial opening of the fluid column, and in the second configuration the elongated plug has an external diameter that is substantially equal to the internal diameter of the longitudinal axial opening of the fluid column.

37. The fluid injection assembly of claim 36, further comprising first and second end plugs received within the longitudinal axial opening of the fluid column on opposing ends of the elongated plug, wherein the first and second end plugs are configured to allow fluid to pass therethrough while limiting the transition of the elongated plug between the first and second configurations to the radial direction.

38. The fluid injection assembly of claim 33, wherein the fluid flow path is further defined by a first transverse opening in fluid communication with the first open end of the fluid column, a second transverse opening in fluid communication with the second open end of the fluid column, and a sealed gap extending between the first and second transverse openings.

39. The fluid injection assembly of claim 38, further comprising a column sleeve disposed over the fluid column, wherein an internal diameter of the column sleeve is larger than an external diameter of the fluid column to define the sealed gap extending between the first and second transverse openings.

40. The fluid injection assembly of claim 39, wherein the saturation valve portion is an O-ring disposed between the first and second transverse openings on an exterior surface of the fluid column.

41. The fluid injection assembly of claim 40, wherein the O-ring is disposed within an annular groove defined within the exterior surface of the fluid column.

42. The fluid injection assembly of claim 39, wherein the column sleeve is moveable on the fluid column between a first position, wherein the column sleeve defines the sealed gap extending between the first and second transverse openings, and a second position.

43. The fluid injection assembly of claim 42, further comprising a locking assembly for selectively locking the column sleeve in the first position.

44. The fluid injection assembly of claim 33, further comprising a column sleeve securable to the fluid column, the column sleeve having a longitudinal axial opening at a first end, a bore at a second end, and a fluid passageway extending between the longitudinal axial opening and the bore.

45. The fluid injection assembly of claim 44, wherein the fluid flow path extends within the longitudinal axial opening, the fluid passageway, and the bore of the column sleeve when the column sleeve is secured to the fluid column.

46. The fluid injection assembly of claim 45, wherein the saturation valve portion is disposed within the bore of the column sleeve.

47. The fluid injection assembly of claim 33, wherein the saturation valve portion is in one of granule and powder form.

48. The fluid injection assembly of claim 33, wherein the saturation valve portion increases in volume by at least 10% in the second configuration.

49. The fluid injection assembly of claim 33, wherein the saturation valve portion increases in volume by at least 20% in the second configuration.

50. The fluid injection assembly of claim 48 or 49, wherein the saturation valve portion is formed from a material having a rate of diffusion of at least $1 \times 10^{-7}$ cm$^2$/s.

51. The fluid injection assembly of claim 33, wherein the saturation valve portion is formed from a material selected from the group consisting of silicone rubber, nitrile rubber, polychoroprene, butyl rubber, and fluoroelastomer, and any combination thereof.

52. The fluid injection assembly of claim 33 or 51, wherein fluid flowing through the fluid flow path is selected from the group consisting of phenylmethyldimethoxysilane, dimethyldimethoxysilane, trimethylmethoxysilane, dimethyldibutoxysilane, tolylethylmethyldimethoxysilane, dimethoxymethyl[2-(methylphenyl)ethyl]silane, cyanobutylmethyldimethoxysilane, 2-(4-methylphenethyl)methylbis(2-ethylhexoxy)silane, di(2-ethylhexoxy)methyl[2-(methylphenyl)ethyl]silane, 3-cyanobutylmethylbis(2-ethylhexoxy)silane, and acetephenone, and any combination thereof.

53. The fluid injection assembly of claim 33, further comprising a fluid absorbent assembly disposed within the fluid flow path of the valve assembly.

54. A valve assembly configured to close off the flow of fluid within a fluid injection assembly, the valve assembly comprising:
(a) a fluid column having a first open end and a second open end;
(b) a fluid flow path defined between the first and second open ends of the fluid column; and
(c) a saturation valve portion disposed within the fluid flow path, wherein the saturation valve portion is a first configuration when no fluid is flowing through the fluid flow path, and wherein the saturation valve portion transitions to a second configuration when fluid is flowing through the fluid flow path, wherein the fluid flowing through the fluid flow path is selected from the group consisting of phenylmethyldimethoxysilane, dimethyldimethoxysilane, trimethylmethoxysilane, dimethyldibutoxysilane, tolylethylmethyldimethoxysilane, dimethoxymethyl[2-(methylphenyl)ethyl]silane, cyanobutylmethyldimethoxysilane, 2-(4-methylphenethyl)methylbis(2-ethylhexoxy)silane, di(2-ethylhexoxy)methyl[2-(methylphenyl)ethyl]silane, 3-cyanobutylmethylbis(2-ethylhexoxy)silane, and acetephenone, and any combination thereof.

55. The valve assembly of claim 54, wherein the saturation valve portion closes off flow within the fluid flow path in the second configuration.

56. The valve assembly of claim 54, wherein the fluid flow path is defined by a longitudinal axial opening of the fluid column.

57. The valve assembly of claim 56, wherein the saturation valve portion is an elongated plug, and in the first configuration the elongated plug has an external diameter that is less than an internal diameter of the longitudinal axial opening of the fluid column, and in the second configuration the elongated plug has an external diameter that is substantially equal to the internal diameter of the longitudinal axial opening of the fluid column.

58. The valve assembly of claim 57, further comprising first and second end plugs received within the longitudinal axial opening of the fluid column on opposing ends of the elongated plug, wherein the first and second end plugs are configured to allow fluid to pass therethrough while limiting the transition of the elongated plug between the first and second configurations to the radial direction.

59. The valve assembly of claim 54, wherein the saturation valve portion is in one of granule and powder form.

60. The valve assembly of claim 59, wherein the saturation valve portion is formed from a material having a rate of diffusion of at least $1\times10^{-7}$ cm$^2$/s.

61. The valve assembly of claim 54, wherein the saturation valve portion increases in volume by at least 20% in the second configuration.

62. The valve assembly of claim 54, wherein the saturation valve portion increases in volume by at least 10% in the second configuration.

63. The valve assembly of claim 62, wherein the saturation valve portion is formed from a material having a rate of diffusion of at least $1\times10^{-7}$ cm$^2$/s.

64. The valve assembly of claim 54, further comprising a fluid absorbent assembly disposed within the fluid flow path.

65. A valve assembly configured to close off the flow of fluid within a fluid injection assembly, the valve assembly comprising:
   (a) a fluid column having a first open end and a second open end;
   (b) a fluid flow path defined between the first and second open ends of the fluid column; and
   (c) a saturation valve portion disposed within the fluid flow path, wherein the saturation valve portion is a first configuration when no fluid is flowing through the fluid flow path, and wherein the saturation valve portion transitions to a second configuration when fluid is flowing through the fluid flow path, wherein the fluid flow path is further defined by a first transverse opening in fluid communication with the first open end of the fluid column, a second transverse opening in fluid communication with the second open end of the fluid column, and a sealed gap extending between the first and second transverse openings, wherein a column sleeve is disposed over the fluid column, wherein an internal diameter of the column sleeve is larger than an external diameter of the fluid column to define the sealed gap extending between the first and second transverse openings.

66. The valve assembly of claim 65, wherein the saturation valve portion is an O-ring disposed between the first and second transverse openings on an exterior surface of the fluid column.

67. The valve assembly of claim 66, wherein the O-ring is disposed within an annular groove defined within the exterior surface of the fluid column.

68. The valve assembly of claim 65, wherein the column sleeve is moveable on the fluid column between a first position, wherein the column sleeve defines the sealed gap extending between the first and second transverse openings, and a second position.

69. The valve assembly of claim 68, further comprising a locking assembly for selectively locking the column sleeve in the first position.

70. A valve assembly configured to close off the flow of fluid within a fluid injection assembly, the valve assembly comprising:
   (a) a fluid column having a first open end and a second open end;
   (b) a fluid flow path defined between the first and second open ends of the fluid column; and
   (c) a saturation valve portion disposed within the fluid flow path, wherein the saturation valve portion is a first configuration when no fluid is flowing through the fluid flow path, and wherein the saturation valve portion transitions to a second configuration when fluid is flowing through the fluid flow path, wherein a column sleeve is securable to the fluid column, the column sleeve having a longitudinal axial opening at a first end, a bore at a second end, and a fluid passageway extending between the longitudinal axial opening and the bore.

71. The valve assembly of claim 70, wherein the fluid flow path extends within the longitudinal axial opening, the fluid passageway, and the bore of the column sleeve when the column sleeve is secured to the fluid column.

72. The valve assembly of claim 71, wherein the saturation valve portion is disposed within the bore of the column sleeve.

* * * * *